(12) United States Patent
Rossin et al.

(10) Patent No.: US 6,707,453 B1
(45) Date of Patent: Mar. 16, 2004

(54) EFFICIENT RASTERIZATION OF SPECULAR LIGHTING IN A COMPUTER GRAPHICS SYSTEM

(75) Inventors: Theodore G Rossin, Fort Collins, CO (US); Byron A Alcorn, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/718,952

(22) Filed: Nov. 21, 2000

(51) Int. Cl.[7] ............................................. G06T 15/10
(52) U.S. Cl. ...................................................... 345/426
(58) Field of Search ................................. 345/419, 426, 345/427, 428, 619

(56) References Cited

U.S. PATENT DOCUMENTS

| 5,224,208 A | * | 6/1993 | Miller, Jr. et al. | .......... 395/125 |
| 5,659,671 A | | 8/1997 | Tannenbaum et al. | ...... 395/126 |
| 5,673,374 A | | 9/1997 | Sakaibara et al. | .......... 395/126 |
| 5,777,620 A | | 7/1998 | Billyard | ...................... 345/426 |
| 6,163,319 A | * | 12/2000 | Peercy et al. | ................ 345/426 |
| 6,384,824 B1 | * | 5/2002 | Morgan et al. | ............. 345/426 |
| 6,400,842 B2 | | 6/2002 | Fukuda | ........................ 382/162 |

FOREIGN PATENT DOCUMENTS

| GB | 2271261 | 4/1994 |
| JP | 11-203501 | 7/1999 |

* cited by examiner

*Primary Examiner*—Phu K. Nguyen

(57) ABSTRACT

A rasterizer implementing a single edge stepping interpolator to interpolate both diffuse and specular lighting components across an edge of the primitive, and/or a single span stepping interpolator to interpolate both diffuse and specular lighting components across the spans of the primitive. When the edge or span being interpolated includes a non-negligible specular lighting component, the diffuse and specular lighting components are separately and successively rasterized. Otherwise, only the diffuse lighting component is interpolated over the edge or span.

20 Claims, 8 Drawing Sheets

COMPUTER GRAPHICS
ENVIRONMENT
100

FIG. 7

| | 0 | 1 | 2 | CONTENT |
|---|---|---|---|---|
| 706 | 0 | 0 | 0 | NO OPERATION |
| 708 | 0 | 0 | 1 | DIFFUSE ONLY 3D PIXEL |
| 710 | 0 | 1 | 0 | 2D FRAME BUFFER WRITE |
| 712 | 0 | 1 | 1 | 2D FRAME BUFFER READ |
| 714 | 1 | 0 | 0 | BLOCK TRANSFER |
| 716 | 1 | 0 | 1 | Z-BUFFER READ |
| 718 | 1 | 1 | 0 | 3D PIXEL DIFFUSE COMPONENT |
| 720 | 1 | 1 | 1 | 3D PIXEL SPECULAR COMPONENT |

702 spans columns 0,1,2; 704 is CONTENT column. 216 COMMAND

FIG. 8

FIFO 206

| | COMMAND 216 | RGB 218 | | | ALPHA 220 | XYZ 222 | | | |
|---|---|---|---|---|---|---|---|---|---|
| FRAGMENT 122A | DIFFUSE ONLY | $R_D$ | $G_D$ | $B_D$ | $\alpha$ | $X_A$ | $Y_A$ | $Z_A$ | ... |
| FRAGMENT 122B | DIFFUSE ONLY | $R_D$ | $G_D$ | $B_D$ | $\alpha$ | $X_B$ | $Y_B$ | $Z_B$ | |
| FRAGMENT 122C | DIFFUSE ONLY | $R_D$ | $G_D$ | $B_D$ | $\alpha$ | $X_C$ | $Y_C$ | $Z_C$ | ... |
| ⋮ | ⋮ | ⋮ | ⋮ | ⋮ | ⋮ | ⋮ | ⋮ | ⋮ | |
| FRAGMENT 122N$_S$ | SPECULAR | $R_S$ | $G_S$ | $B_S$ | $\alpha$ | $X_N$ | $Y_N$ | $Z_N$ | |
| FRAGMENT 122N$_D$ | DIFFUSE | $R_D$ | $G_D$ | $B_D$ | $\alpha$ | $X_N$ | $Y_N$ | $Z_N$ | ... |
| FRAGMENT 122M$_S$ | SPECULAR | $R_S$ | $G_S$ | $B_S$ | $\alpha$ | $X_M$ | $Y_M$ | $Z_M$ | |
| FRAGMENT 122M$_D$ | DIFFUSE | $R_D$ | $G_D$ | $B_D$ | $\alpha$ | $X_M$ | $Y_M$ | $Z_M$ | ... |
| | ⋮ | ⋮ | ⋮ | ⋮ | ⋮ | ⋮ | ⋮ | ⋮ | |

EFFICIENT RASTERIZATION OF SPECULAR LIGHTING IN A COMPUTER GRAPHICS SYSTEM

BACKGROUND OF THE INVENTION

1. Field of the Invention

The present invention relates generally to graphics systems and, more particularly, to rasterization of a graphics primitive in a computer graphics system.

2. Related Art

Computer graphics systems are commonly used for displaying two- and three-dimensional graphical representations of objects on a two-dimensional video display screen. Current computer graphics systems provide highly detailed representations and are used in a variety of applications.

In a typical computer graphics system an object, or model, to be presented on the display screen is decomposed into graphics primitives. Primitives are basic components of a graphics display and include, for example, points, lines, triangles, quadrilaterals and polygons. Typically, a hardware/software scheme is implemented to render, or draw, the graphics primitives that represent a view of one or more objects being presented on the display screen.

Generally, a host computer defines primitives of a three-dimensional model in terms of primitive data. Typically, primitive data includes, but is not necessarily limited to, the X, Y, Z, and W coordinates of the primitive's vertices, as well as the red, green, blue, and alpha (R, G, B, A) color values of each vertex of the primitive. Rendering hardware processes the primitive data to compute the display screen pixels that represent each primitive, and the color values for each pixel.

The basic components of a computer graphics system typically include a host computer and graphics hardware. The host computer executes a graphics application program that controls the graphics hardware, commonly through an application program interface (API). The API receives commands from the graphics application program and provides primitive data to the graphics hardware. The graphics hardware typically includes one or more geometry accelerators, a rasterizer, a frame buffer and, oftentimes, a texture mapper. The geometry accelerator receives primitive data from the host computer and performs operations such as coordinate transformations and lighting, clipping, and plane equation calculations for each primitive. The geometry accelerator generates rendering data that is used by the rasterizer and the texture mapper to generate final screen coordinates and color data for each pixel in each primitive.

Texture mapping permits objects to be displayed with improved surface detail. Texture mapping maps a source image, referred to as a texture, onto the surface of a three-dimensional object, and thereafter projects the textured three-dimensional object to the two-dimensional graphics display screen. Texture mapping involves applying one or more texture elements (texels) of a texture to each picture element (pixels) of the displayed portion of the object to which the texture is being mapped. Texture mappers typically include a local memory cache that stores texture mapping data associated with the portion of the object being rendered. The pixel data from the rasterizer and the texel data from the texture mapper are combined by the rasterizer and stored in the frame buffer by a frame buffer controller for display on a display screen.

Graphics systems typically model the effects of one or more light sources on three-dimensional objects when they are rendered. The ultimate color of a three-dimensional object is dependent on the quantity and characteristics of light shining on the object. Typically, the color of a light source is characterized by the quantity of red, green, and blue light it emits. Additional requirements are often necessary to provide an accurate lighting effect in a rendered image. In OpenGL, for example, a light source has an effect only when a surface reflects the light emitted by the light source. Each surface of an object is composed of a material having various properties. The material properties define the percentage of received red, green and blue light components that is reflected by the surface in various directions. The material properties of a surface thereby influence the effect that light striking the surface will have and, as a result, influence the colors used to render pixels representing the object surface.

Generally, four independent types of lighting are offered in conventional graphics systems. They are commonly referred to as diffuse, specular, emissive and ambient light. Diffuse light is light that comes from one direction. Diffuse light is brighter when it comes squarely down on a surface than when it barely glances off the surface. Once diffuse light hits a surface, however, it is scattered equally in all directions, appearing to be equally bright no matter where the viewer's eye is located. Any light coming from a particular position or direction typically has a diffuse component. Specular light comes from a particular direction, and tends to bounce off a surface in a preferred direction. For example, a well-collimated laser beam reflected by a high-quality mirror produces almost 100 percent specular reflection in a specific direction. Shiny metal and plastic have a high specular component while chalk or carpet have almost none. Emissive light is light that is emitted by a material such as headlights on an automobile. Ambient light is light that has been scattered so much by the environment that its direction cannot be determined; that is, it seems to come from all directions. Traditionally, the red, green, and blue values for each type of lighting effect are determined and managed separately by the graphics application.

A common concern in the design of graphics systems is the size and cost of circuitry implemented in the rasterizer. Generally, a rasterizer converts each primitive into fragments by scan converting the vertex definitions of the primitive components to corresponding values at each pixel rendering the primitive. Each fragment includes a quantity of related data defining a pixel in the rendered image. Traditional graphics systems attempt to conserve circuitry and memory by combining certain components prior to rasterization. Commonly, two such components are the diffuse and specular lighting components. These two components are combined into a single, combined diffuse/specular lighting value that is subsequently rasterized. The final color value of a fragment is based on the product of the texture mapping component and this combined lighting component.

The inventors of the present application have observed drawbacks to this approach. One such drawback is that the reflectivity of a surface is scaled by the intensity of the surface texture. That is, the intensity of the texture determines not only the ultimate color value of a pixel, but also the effect of the specular lighting component on that surface. This approach does not produce accurate results for pixels having very low intensity values. Specifically, when traditional rasterizers produce pixels having minimal or no intensity value (for example, pixels with a black texture), the pixels are rendered black regardless of the value of the original specular lighting component. In other words, this approach fails to display dark surfaces as shiny or reflective even when the light impinging on that surface has a significant specular lighting component. This inability to render such surfaces reduces the realism of certain images.

SUMMARY OF THE INVENTION

The present invention is directed to a rasterizer and associated methodology that overcome the above and/or other drawbacks of conventional rasterization and graphics processing approaches. The invention implements a single edge stepping interpolator to interpolate both diffuse and specular lighting components across an edge of the primitive, and/or a single span stepping interpolator to interpolate both diffuse and specular lighting components across the spans of the primitive. When the edge or span being interpolated includes a non-negligible specular lighting component, the diffuse and specular lighting components are separately and successively rasterized. Otherwise, only the diffuse lighting component is interpolated over the edge or span. This enables the invention to achieve an optimal balance between the size and cost of the rasterizer circuitry and the efficiency with which primitives are rasterized.

The inventors have observed that of the millions of graphics primitives that may form a three-dimensional image, typically only a few primitives have a specular lighting component. That is, specular lighting is not a significant portion of most scenes because the vast majority of polygons that make a scene lack the appropriate direction and orientation relative to the rendered light sources to cause a specular lighting effect to occur. This has lead the inventors to conclude that transferring, storing, and processing specular lighting components to calculate pixel color values for pixels in most graphics primitives is unnecessary and constitutes an inefficient use of resources. To overcome the observed drawback of conventional rasterization approaches while taking advantage of the rare presence of specular lighting, the present invention separately rasterizes the specular lighting component of only those few graphics primitives having a non-negligible specular lighting component. The specular lighting component for the remaining majority of primitives is zero and, therefore, not processed.

Specifically, a rasterizer of the present invention implements a single interpolator circuit to separately scan convert both diffuse and specular lighting components across a scanned portion, such as a edge or a span, of the primitive. That is, for each type of interpolator implemented in the rasterizer, a single interpolator of the invention is used for interpolating both the diffuse and specular lighting components. This is in contrast with conventional rasterizers that implement a single interpolator to interpolate each component of the primitive across portions of the primitive. For example, a typical conventional rasterizer includes three edge steppers and three span steppers to interpolate the coordinates of a primitive along edges and spans, respectively, of the primitive.

When the interpolated portion of the primitive includes a non-zero specular lighting component, the single interpolator circuit separately and successively interpolates the diffuse and specular lighting components. Otherwise, only the diffuse lighting component is interpolated. Thus, rasterization of a primitive to its component pixels entails interpolating the diffuse and specular lighting components in separate and successive processing states, and doing so only when the primitive includes a specular lighting component greater than zero or some other negligible value. This requires two processing states rather than one to interpolate each fragment of those portions of the interpolated primitive having both lighting components. This decreases the efficiency with which those relatively few primitives are rasterized. However, by re-using the same interpolator circuitry to interpolate both diffuse and specular lighting components, the present invention accurately rasterizes scenes using a minimal amount of circuitry as compared to conventional systems, thereby reducing the relative size and cost of the rasterizer. Thus, the invention provides significant savings in rasterizer circuitry while insuring that all object surfaces, including those that have low color intensity, properly exhibit the specular lighting contribution, if any. These significant advantages are provided at an expense of reducing minimally the responsiveness of the implementing graphics system.

A number of aspects of the invention are summarized below, along with different embodiments that may be implemented for each of the summarized aspects. It should be understood that the embodiments are not necessarily inclusive or exclusive of each other and may be combined in any manner that is non-conflicting and otherwise possible. It should also be understood that these summarized aspects of the invention are exemplary only and are considered to be non-limiting.

In one aspect of the invention a rasterizer is disclosed. The rasterizer includes one interpolator to interpolate both diffuse and specular lighting component of each color component (for example, red, green, blue) of a graphics primitive, generating values for the diffuse and specular lighting color components at each fragment in a rasterized form of the primitive. Importantly, the interpolator consists of only one adder circuit element to perform interpolation functions. When the portion of the primitive being rasterized includes a non-negligible specular lighting component, the diffuse and specular lighting components are separately interpolated for each fragment of the interpolated portion of the primitive. When the primitive includes a negligible specular lighting component, only the diffuse lighting component is interpolated. Preferably, the specular lighting component is considered to be negligible when its color component values are zero.

In another aspect of the invention, a rasterizer to rasterize graphics primitives to their component pixels is disclosed. The rasterizer is constructed and arranged to process diffuse and specular lighting components of each pixel in separate and successive processing states, and does so only when an interpolated portion of the primitive comprising the pixels includes a specular lighting component greater than approximately zero. Typically, the lighting component is itself comprised of color components such as red, green and blue color components. In one embodiment, the rasterizer includes a scan converter and a control apparatus. The scan converter includes a plurality of interpolators. For each color component the interpolators include one interpolator that interpolate that color component of both diffuse and specular lighting components of the primitive. The control apparatus controls the scan converter such that for each fragment the scan converter separately and successively scan converts a diffuse lighting component and a specular lighting component of the primitive when the primitive includes a specular lighting component. When the primitive does not include a specular lighting component, the scan converter scan converts only the diffuse lighting component. In rasterizers that include interpolators that determine fragments along edges of the rasterized form of the primitive and interpolators that determine fragments in the interior of the rasterized form of the primitive, the single interpolator can either one or the other type of interpolator.

In a further aspect of the invention a rasterizer for converting graphics primitives represented by primitive data into fragments represented by one or more fragment data words is disclosed. Each fragment corresponds to a pixel of a rendered image and includes RGB and texture values for the pixel. The rasterizer includes a scan converter that scans each primitive defined by primitive data, converting the vertex definition of each primitive into fragments, each represented by one or two fragment data words. A control circuit configured to control the scan converter is also included. The control circuit causes the rasterizer to interpolate in two successive processing states the primitive data for any fragment in which the primitive data indicates that the fragment has a non-negligible specular lighting component. Preferably, the two successive processing states include a first processing state in which the control circuit determines the specular lighting component value for the fragment and a second processing state in which the control circuit determines the diffuse lighting component value for the fragment. In one embodiment, the control circuit controls the scan converter to interpolate the primitive data for a fragment in a single processing state in which the scan converter generates color values for the primitive without consideration of the specular lighting component of the primitive when the primitive data indicates that the primitive does not have a specular lighting component.

In a still further aspect of the invention, a rasterizer in a graphics system including at least one geometry accelerator is disclosed. The rasterizer includes a scan converter to receive graphics primitive signals descriptive of a graphics primitive to be rasterized and to generate graphics fragment signals from the graphics primitive signals. The graphics primitive signals include lighting component signals which, in turn, include diffuse lighting component signals indicating a diffuse lighting component of the graphics primitive and specular lighting component signals indicating a specular lighting component of the graphics primitive. A controller receives the specular lighting component signals and transmits command signals to the scan converter to instruct the scan converter to process the lighting component signals in a one-state mode when the specular lighting component indicated by the specular lighting component signals is negligible and to process the lighting component signals in a two-state mode when the specular lighting component indicated by the specular lighting component signals is non-negligible. A fragment processor generates color values for fragments of the graphics primitive to be rendered based the graphics fragment signals, the fragment processor generating the color values under instruction of the controller in the one-state mode when the specular lighting component indicated by the specular lighting component signals is negligible and to generate the color values in the two-state mode when the specular lighting component indicated by the specular lighting component signals is non-negligible.

In a still further aspect of the invention, a rasterizer for use in a graphics system is disclosed. The rasterizer includes a single processing channel configured to rasterize diffuse and specular lighting components of a graphics primitive in successive processing states only under the conditions when the graphics primitive includes a specular lighting component and a diffuse lighting component.

In another aspect of the invention, a method for rasterizing primitives of a graphics image is disclosed. The method includes the steps of: 1) determining, for each pixel of the primitive, whether the pixel includes a specular lighting component having a value greater than zero; 2) when the specular lighting component has a value greater than zero, processing a diffuse lighting component and a specular lighting component in separate and successive processing states; and 3) when the specular lighting component has a value of zero, processing only a diffuse lighting component of the pixel.

Various aspects of the present invention and embodiments thereof provide certain advantages and overcome certain drawbacks of conventional techniques. Not all aspects and embodiments share the same advantages and those that do may not share them under all circumstances. These disclosed aspects, some of which are summarized below, are not to be construed as limiting in any regard; they are provided by way of example only and in no way restrict the scope of the invention.

Further features and advantages of the present invention as well as the structure and operation of various embodiments of the present invention are described in detail below with reference to the accompanying drawings. In the drawings, like reference numerals indicate identical or functionally similar elements. Additionally, the left most one or two digits of a reference numeral identify the drawing in which the reference numeral first appears.

BRIEF DESCRIPTION OF THE DRAWINGS

The foregoing and other features and advantages of the present invention will be understood more clearly from the following detailed description and from the accompanying figures. This description is given by way of example only and in no way restricts the scope of the invention. In the figures:

FIG. 7 is a diagram of commands generated by the optimized rasterizer in accordance with one embodiment of the present invention.

FIG. 8 is a diagram of fragment data stored in the FIFO illustrated in FIG. 3.

DETAILED DESCRIPTION

I. Introduction

Figure 1A:
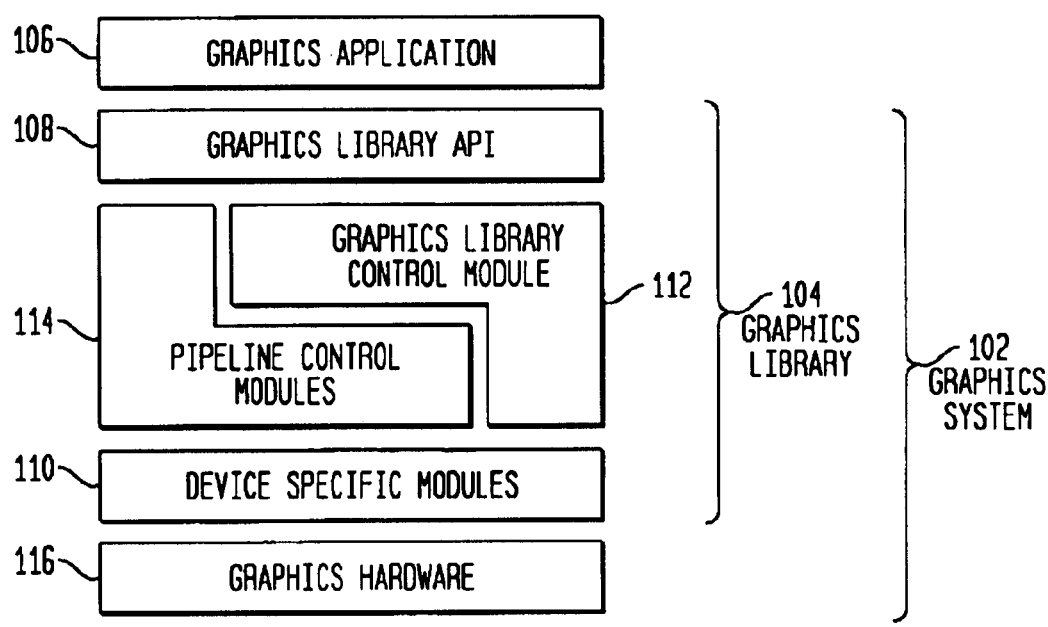
FIG. 1A is a layered architectural block diagram of an exemplary computer graphics system in which the present invention may be implemented.

Aspects of the present invention disclosed below are directed to various embodiments of a rasterizer and associated rasterization operations. Briefly, a rasterizer of the present invention implements a single interpolator circuit to separately scan convert both diffuse and specular lighting components across a scanned portion of the primitive, such as a edge or a span of the primitive. When the interpolated portion of the primitive includes a non-zero specular lighting component, the diffuse and specular lighting components are separately and successively rasterized by the single interpolator circuit. Otherwise, only the diffuse lighting component is interpolated. Preferably, the original plane equations defining the primitive are used to determine whether an edge or a span of a primitive includes a specular lighting component. Advantageously, the present invention provides an optimal balance between the size and cost of the rasterizer circuitry and the efficiency with which primitives are rasterized, while producing an image that accurately represents the specular lighting contribution.

A minimal reduction is efficiency is experienced by a graphics system implementing the present invention. This is due to the fact that only a few of the millions of graphics primitives that typically form a three-dimensional image have a specular lighting component. That is, specular lighting is not a significant portion of most rendered scenes because the vast majority of polygons that make a scene lack the appropriate direction and orientation relative to the rendered light sources to cause a specular lighting effect to occur. Thus, transferring, storing, and processing specular lighting components to calculate pixel color values for pixels in most graphics primitives is unnecessary and constitutes an inefficient use of resources. To accurately render images while taking advantage of the rare presence of specular lighting, the present invention separately rasterizes the specular lighting component of only those few graphics primitives having a non-negligible specular lighting component. The specular lighting component for the remaining majority of primitives is negligible and, therefore, not processed. In the embodiment disclosed herein, for a specular lighting component to considered negligible it has a value of zero. Specifically, a rasterizer of the present invention includes common edge stepper or interpolator to rasterize both diffuse and specular lighting components across an edge of the primitive and/or a single span stepper or interpolator to rasterize both the diffuse and specular lighting components across a span of the primitive. Each consolidated interpolator interpolates the diffuse and specular lighting components separately, and do so only when the primitive includes a specular lighting component greater than some nominal threshold value. This requires two, preferably successive, processing states rather than one to interpolate that portion of the rasterized primitive. This decreases the efficiency with which the primitive is rasterized. However, by utilizing the same interpolator to scan convert both diffuse and specular lighting components, the present invention provides a rasterizer having a size and cost that is substantially less than conventional systems. The present invention provides such a significant savings in rasterizer circuitry while insuring that all object surfaces, including those that have low color intensity, properly reflect the contribution of specular lighting. These significant advantages are provided at an expense of reducing minimally the responsiveness of the implementing graphics system.

II. Exemplary Graphics System Environment
A. System Architecture

FIG. 1A is an architectural block diagram of an exemplary computer graphics environment 100 suitable for incorporation of the accelerated rasterizer and associated methodologies of the present invention. A graphics system 102 provides a computer platform on which software applications such as graphics application 106 execute. Graphics system 102 communicates with, and is responsive to, graphics application 106. Computer graphics system 102 includes a graphics library 104 and device-specific modules 110 through which graphics application 106 controls graphics hardware 116.

In this exemplary application, graphics library 104 provides an application program interface (API) 108 of function calls through which graphics application 106 communicates with controls efficiently graphics system 102. Graphics library API 108 is preferably a streamlined, hardware-independent interface designed to be implemented on many different computer platforms of which graphics system 102 are one example. In graphics environment 100, graphics library 104 provides function calls that are used to specify objects and operations to produce interactive, three-dimensional applications. As such, graphics application 106 can issue function calls to computer graphics system 102 according to the specifications defined by API 108 without information regarding the configuration of the underlying graphics hardware 116.

In one embodiment, graphics library API 108 is an OpenGL® API which provides a graphics library of low-level graphics manipulation commands for describing models of three-dimensional objects. The OpenGL standard is described in the "OpenGL Programming Guide," version 1.1 (1997), the "OpenGL Reference Manual," version 1.1 (1997) and the "OpenGL Specification," version 1.1 (1997), all of which are hereby incorporated by reference herein in their entirety. However, as one skilled in the relevant art will find apparent, graphics library API 108 may be any other proprietary or publicly available graphics library such as the commonly available PEX (PHIGS Extension to X) library available from, for example, the X-Consortium. Graphics application 106 may be any graphics software application now or later developed that is capable of communicating with the graphics system 102 through the implemented graphics library API 108. Such graphics applications may be, for example, a database, a CAD/CAM application, an architectural design application, a civil engineering application, a word processing package, or the like.

Graphics library 104 includes a graphics library control module 112 and multiple pipeline control modules 114. Graphics library control module 112 performs well-known functions such as managing graphics library state information and informing other components of graphics library 104 of state changes. Graphics library control module 112 generally performs graphics library functions defined by API 108 and maintains corresponding data structures that store the noted state information. Graphics library 104 may be implemented, for example, using the C programming language.

Pipeline control modules 114 perform well-known operations associated with the control of the graphics pipeline. Pipeline control modules 114 maintain derived internal graphics state information and provide such state information to device-specific modules 110 and graphics hardware 116. Operations include, for example, scheduling operators, buffering vertex API data and executing operators on primitives to generate data for rasterizers located in graphics hardware 116. Such functions and operations are described below with reference to FIG. 1B.

Device-specific modules 110 provide primitive data, including vertex state (coordinate) and property state (color, lighting, etc.) data to graphics hardware 116. Graphics hardware 116 may be any well-known graphics hardware such as the Visualize FX4 Graphics System, available from Hewlett-Packard Company, Palo Alto, Calif. Computer graphics system 102 is typically a high performance workstation such as the HP Visualize Workstation also manufactured and sold by Hewlett-Packard Company. The computer graphics system preferably implements the HP-UX operating system, which is a UNIX based operating system. It will be understood that any workstation or other computer having similar capabilities may be utilized within the scope of the present invention.

B. Rendering Pipeline

Figure 1B:
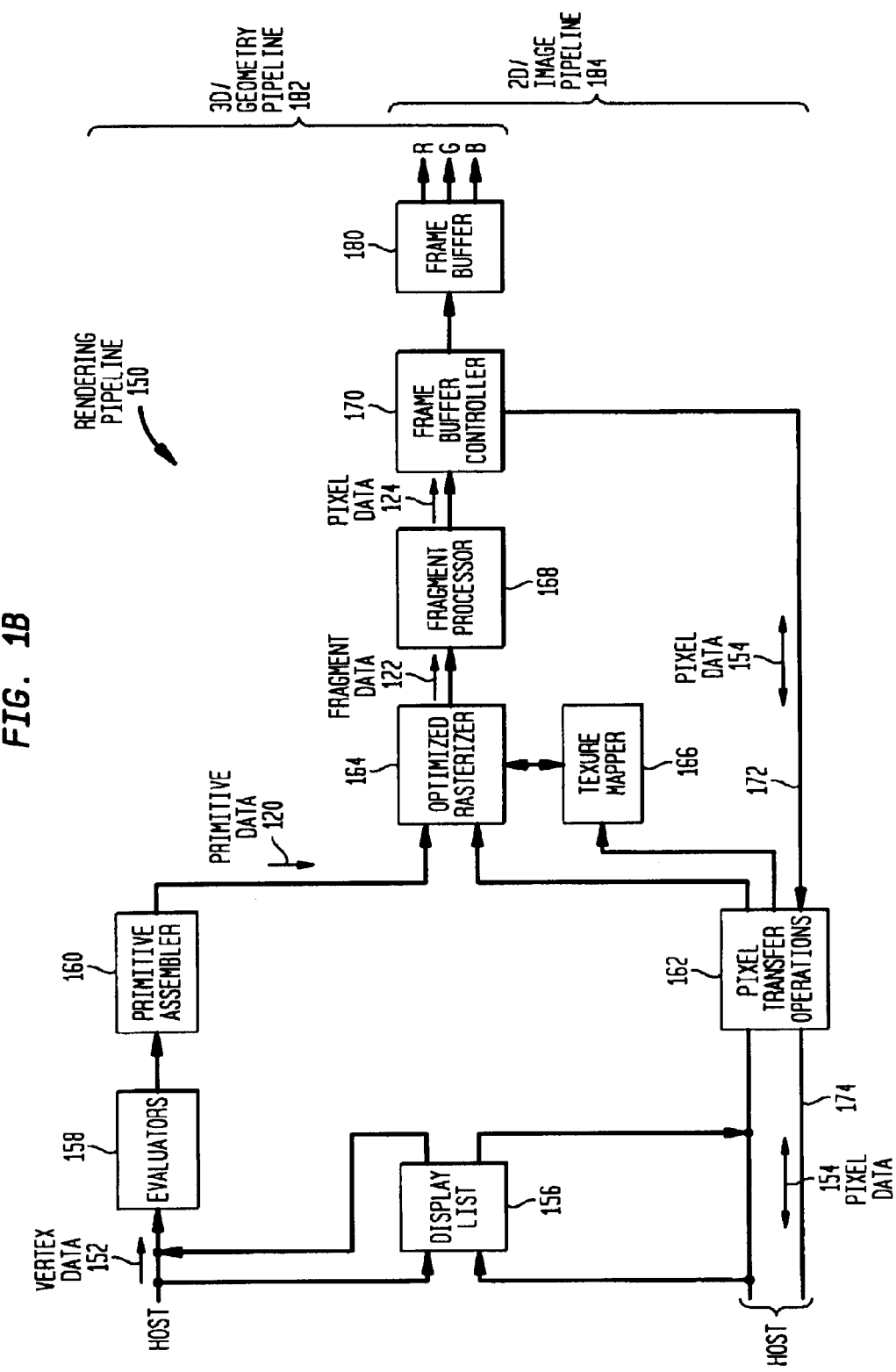
FIG. 1B is a functional block diagram of an exemplary rendering pipeline suitable for implementing the present invention.

In one exemplary graphics environment 100, graphics hardware 116, device specific modules 110 and pipeline control module 114 define a pipelined graphics architecture. FIG. 1B is a functional block diagram of an exemplary rendering pipeline 150 implemented in accordance with the OpenGL graphics library specification. Rendering pipeline 150 is commonly referred to as an OpenGL graphics pipeline. The present invention will be described with reference to such a rendering pipeline implementation. It should become apparent to those of ordinary skill in the art, however, that the present invention may be implemented in any graphics rendering pipeline now or later developed as well as in other non-pipelined architectures.

There are two paths through rendering pipeline 150: a geometric or three-dimensional (3D) pipeline 182 and an imaging or two-dimensional (2D) pipeline 184. Geometric pipeline 182 creates a two-dimensional image from one or more model views constructed from geometric primitives defined by vertex data 152. Vertex data 152 is processed to form a two-dimensional image for display on a two-dimensional display screen.

On the other hand, imaging or two-dimensional pipeline 184 manipulates pixel data 154 representing two-dimensional images. Pixel data 154 is read from frame buffer 180 by frame buffer controller 170, as shown by line 172, or from system memory, as shown by line 174. Pixel data 154 (pixels, images and bit maps) is first processed by pixel transfer operations processing stage 162. Pixels from system memory or frame buffer 180 are first unpacked from one of a variety of formats into the proper number of components. The pixel data is then scaled, biased and processed by a pixel map. The results are clamped and then either written into a texture memory in texture mapper 166 or sent to optimized rasterizer 164. Alternatively, these results are packed into an appropriate format and returned to an array in system memory via line 174.

All data, whether it represents primitives (vertex data 152) or pixels (pixel data 154) can be processed immediately in pipeline 150. Alternatively, data 152, 154 can be saved in a display list 156 for current or later use. When a display list 156 is executed, the retained data is sent from display list 156 as if it were sent by graphics application 106 to be processed immediately.

All geometric primitives are initially described by vertices. Parametric curves and surfaces may be initially described by control points and polynomial functions. Evaluators 158 perform operations to derive the vertices used to represent the surface from the control points. One common method known as polynomial mapping can produce surface normal, texture coordinates, colors, and spatial coordinate values from the control points.

Vertex data 152 then enters primitive assembler processing stage 160 at which the vertices are converted into primitives. Here, spatial coordinates are projected from a position in the three-dimensional world to a position on the two-dimensional display screen. In the illustrative embodiment wherein texturing is used, texture coordinates are generated and transformed by texture mapping processing stage 166. If lighting is enabled, lighting calculations are performed using transformed vertex, surface normal, light source position, material properties, and other lighting information to produce a color value for the primitive that is then processes by optimized rasterizer 164 in accordance with the present invention.

With respect to primitive assembly, processing stage 160 performs, among other functions, clipping operations. Clipping is the elimination of portions of primitive that fall outside a half-space, defined by a plane. In some cases, this is followed by perspective division, which makes distant geometric objects appear smaller than closer objects. Then viewpoint and depth operations are applied. If culling is enabled and the primitive is a polygon, it then may be rejected by a culling test. The results of pixel operations performed by primitive assembler 160 are complete geometric primitives, which are the transformed and clipped vertices with related color, depth, and sometimes texture-coordinate values and guidelines for rasterization processing stage 164. In the exemplary embodiment illustrated in FIG. 1B, texture assembly processing stage 166 applies texture images onto geometric objects in any well-known manner.

Optimized rasterization processing stage 164 is shared by geometric pipeline 182 and imaging pipeline 184. In rasterization processing stage 164, primitives are converted into fragments. Each fragment square corresponds to a pixel in frame buffer 180. Pixel data 154 is a special type of fragment with no associated depth, texture or fog components. Line and polygon stipples, line width, point size, shading model and coverage calculations to support antialiasing are taken into consideration as vertices are connected into lines or the interior pixels are calculated for a filled polygon. Color, texture, fog and depth values are assigned for each fragment square in rasterization processing stage 164.

In accordance with the present invention, rasterizer 164 implements a single, common interpolator to scan convert both diffuse and specular lighting components across a scanned portion of the primitive. A first interpolator circuit is implemented to scan convert the specular and diffuse lighting components across the edges of the primitive. A second interpolator circuit is implemented to scan convert the specular and diffuse lighting components across the spans of the primitive. Rasterizer 164 is controlled to process pixels of primitives having a non-zero specular lighting component in two separate and successive processing steps, one for the diffuse lighting component and one for the specular lighting component. Otherwise, the specular lighting component is ignored and only the diffuse lighting component is interpolated. By using the same interpolator circuit to rasterize both diffuse and specular lighting components, rasterizer 164 rasterizes scenes using a minimal amount of circuitry thereby reducing both the size and cost of the rasterizer. By interpolating the diffuse and specular lighting components separately, rasterizer 164 insures that all object surfaces, including those that have a low color intensity, properly reflect the contribution of specular lighting, if any. The structure and operation of embodiments of optimized rasterizer 164 are provided below.

Fragment processor 168 generates pixel data to be written into frame buffer 180 by frame buffer controller 170 for subsequent rendering on a two-dimensional display screen. In fragment processing stage 168, a series of optional operations are performed that may alter or eliminate fragments. These operations, which can be enabled or disabled individually, include texturing, fog calculations, scissor testing, alpha testing, stencil testing and depth testing. Blending, dithering and masking operations follows these tests. All of these operations are considered to be well known in the art. In addition, fragment processor 168 is controlled or modified to process fragment in accordance with various aspects of the present invention.

It should be understood from this disclosure that the present invention may be implemented in any computer-based system that may benefit from efficient rasterization. Graphics system 100 is utilized herein as just one such implementation since graphics systems may particularly benefit from the present invention; the presentation of graphics system 100 herein should not to be considered limiting in any respect.

II. Optimized Rasterizer 164

Figure 2:
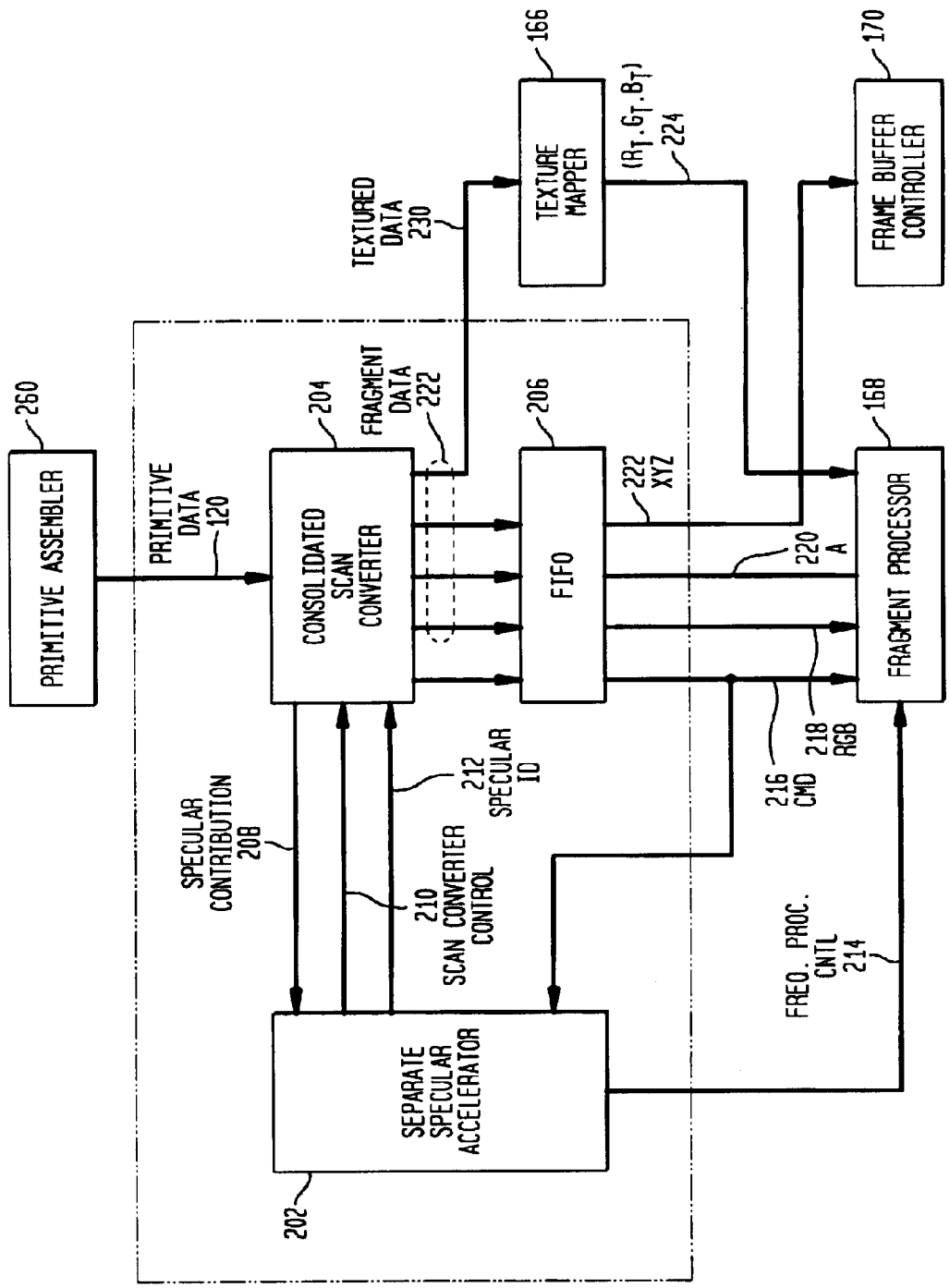
FIG. 2 is a block diagram of one embodiment of the optimized rasterizer illustrated in FIG. 1B.

FIG. 2 is a functional block diagram illustrating optimized rasterizer 164 including separate specular accelerator 202 in accordance with one embodiment of the present invention. As noted, optimized rasterizer 164 receives primitives, represented by primitive data 120, from primitive assembler 160, and converts the defined primitives into fragments, represented by fragment data 122. As noted, each fragment includes a quantity of data defining a corresponding pixel of the rendered image. Optimized rasterizer 164 transmits fragment data 122 to fragment processor 168 as noted above and described in detail below. As used herein, the fragment data and the fragment defined by the fragment data are given the same reference number and are used interchangeably. Each fragment 122 includes color (RGB) values 218, an (optional) alpha (A) value 220, coordinate (X,Y,Z) value 222 and texture ($R_T,G_T,B_T$) values 224 for the corresponding pixel. In addition to fragment data 122, rasterizer 164 also generates a command 216 for each fragment 122 instructing fragment processor 168 how the corresponding fragment 122 is to be processed by fragment processor 168.

Graphics system 102 (FIG. 1A) models the effects of one or more light sources on three-dimensional objects to be rendered. The colors that graphics system 102 uses to render a three-dimensional object depend upon the quantity and qualities of light shining on the object and on the properties of the object surfaces. In the illustrative embodiment in which API 108 (FIG. 1A) is an OpenGL® API, the four noted types of lighting are each defined in terms of their red, green and blue components. Thus, the color of a light source is characterized by the amount of red, green, and blue light it emits. As noted, of particular relevance to the present invention are the diffuse and specular lighting components. As noted, diffuse light is light that comes from one direction and, when reflected off a surface, is scattered equally in all directions. Specular light comes from a particular direction, and tends to reflect off a surface in a preferred direction.

Rasterizer 164 includes a consolidated scan converter 204 that scans each primitive defined by primitive data 120, converting each primitive into one or more fragments 122. As noted, each fragment 122 corresponds to a pixel that is ultimately stored in frame buffer 180 (FIG. 1B). Scan converter 204 includes interpolators that calculate, for each component of the graphics primitive, a value at each fragment in the rasterized form of the graphics primitive. In other words, scan converter 204 converts the vector-level description of the graphics primitive into values for each fragment in the graphics primitive. Rasterizer 164 also includes a staging FIFO 206 to compensate for the latency of texture mapper 166. Fragment data 120 is transferred through FIFO 206 to insure proper data transfer timing with respect to texture parameters 224 generated by texture mapper 166.

As is well-known in the art, rasterizers generally include interpolators that scan convert the edges of the primitive, referred to generally as edge steppers, and interpolators that scan convert the interior spans of the primitive, referred to generally as span steppers. As will be described in detail below, for each type of interpolator (edge steppers and span steppers), scan converter 204 includes a single interpolator circuit constructed and arranged to separately and successively scan convert specular and diffuse lighting components. As such, scan converter 204 is referred to herein as consolidated scan converter 204. Consolidated scan converter 204 provides resulting texture data 208 to texture mapper 166, and fragment data 120 to fragment processor 168. Separate specular accelerator 202 controls scan converter 204 to optimally interpolate the specular lighting component separately from the diffuse lighting component, resulting in a primitive in which the specular lighting contribution is accurately depicted in the rendered image, while providing a significant reduction in scan conversion circuitry. This is described in detail below.

Separate specular accelerator 202, or simply accelerator 202, determines whether each scanned portion (edge or span) of the graphics primitive defined by primitive data 120 has a specular lighting component. In the illustrative embodiment, accelerator 202 receives a specular parameter signal 208 from consolidated scan converter 204 indicating whether the currently interpolated portion of the primitive includes a specular lighting component. In accordance with the present invention, accelerator 202 controls the scan conversion of the diffuse and specular lighting components based on whether the vertex definition of the primitive includes a specular lighting component. Accelerator 202 generates a scan converter control signal 210 to control scan converter 204 to process primitive data 120 in one or two successive processing states, depending on the contents of specular parameter 208.

Specifically, accelerator 202 determines whether the specular lighting component of a primitive is negligible (in the disclosed embodiment, zero). When accelerator 202 determines that the specular lighting component is negligible, accelerator 202 controls scan converter 204 to generate color values for the graphics primitive in a single processing state, referred to herein as a one-state mode. As described in greater detail below, in this single state mode, rasterizer 164 generates color values for the graphics primitive without using the specular lighting component of the graphics primitive, and does not otherwise process or store the specular lighting components of the primitive. Because a negligible specular lighting component does not contribute noticeably, if at all, to the resulting color values of the pixels that render the primitive, the omission of processing and storing such specular lighting components does not detract from the quality of the rendered graphics primitive.

When accelerator 202 determines that the specular lighting component is not negligible (in the disclosed embodiment, non-zero), accelerator 202 controls scan converter 204 to generate color values for the graphics primitive in a two-state mode wherein scan converter 204 generates color values for the graphics primitive using both, the diffuse lighting component and the specular lighting component. Scan converter 204 utilizes a single interpolator circuit to process the two lighting components separately; that is, in successive processing states. This enables scan converter 204 to overcome the problems associated with conventional approaches that combine the lighting parameter values during the primitive assembler stage 160. Furthermore, use of a single interpolator to process the specular and diffuse lighting parameters reduces considerably the amount of circuitry required to implemented consolidated scan converter 204 and FIFO 206.

FIFO 206 includes a series of fragment data words 122 each defining data for one fragment. In one embodiment described in detail below, scan converter 204 double-writes fragment data words into FIFO 206 when interpolating both diffuse and specular lighting in successive processing states. In such an embodiment, scan converter 204 generates two fragment data words 122 for the fragments defining the portion of the primitive that has a specular lighting component. Such an embodiment is utilized in the disclosed embodiment and is described below. However, it is contemplated that in alternative embodiments, scan converter 204 generates a single fragment data word 122 that includes both, the diffuse and specular lighting components, with the diffuse lighting component values being written to a separate memory region that the specular lighting component values.

Separate specular accelerator 202 also controls the processing performed by fragment processor 168. For each fragment defined in fragment data 122 there is an associated command 216 that provides complementary information to fragment processor 168. In the embodiment described below in which two fragment data words are generated for each fragment having both lighting components, accelerator 202 also controls fragment processor 168 to process the resulting fragment data 122 based on whether the associated fragment includes a diffuse or specular lighting component value. Since the same interpolator circuit of scan converter 204 is utilized to process both, the specular lighting and diffuse lighting component, and since they are processes separately, each resulting fragment data word 122 will either include a diffuse or specular a lighting component value, with both lighting components written into the same region of FIFO 206. To insure proper processing by fragment processor 168, accelerator 202 controls which input buffer of fragment processor 168 each fragment data word 122 is written to through the generation of fragment processor control command 214 based on the values of command 216.

Figure 3:
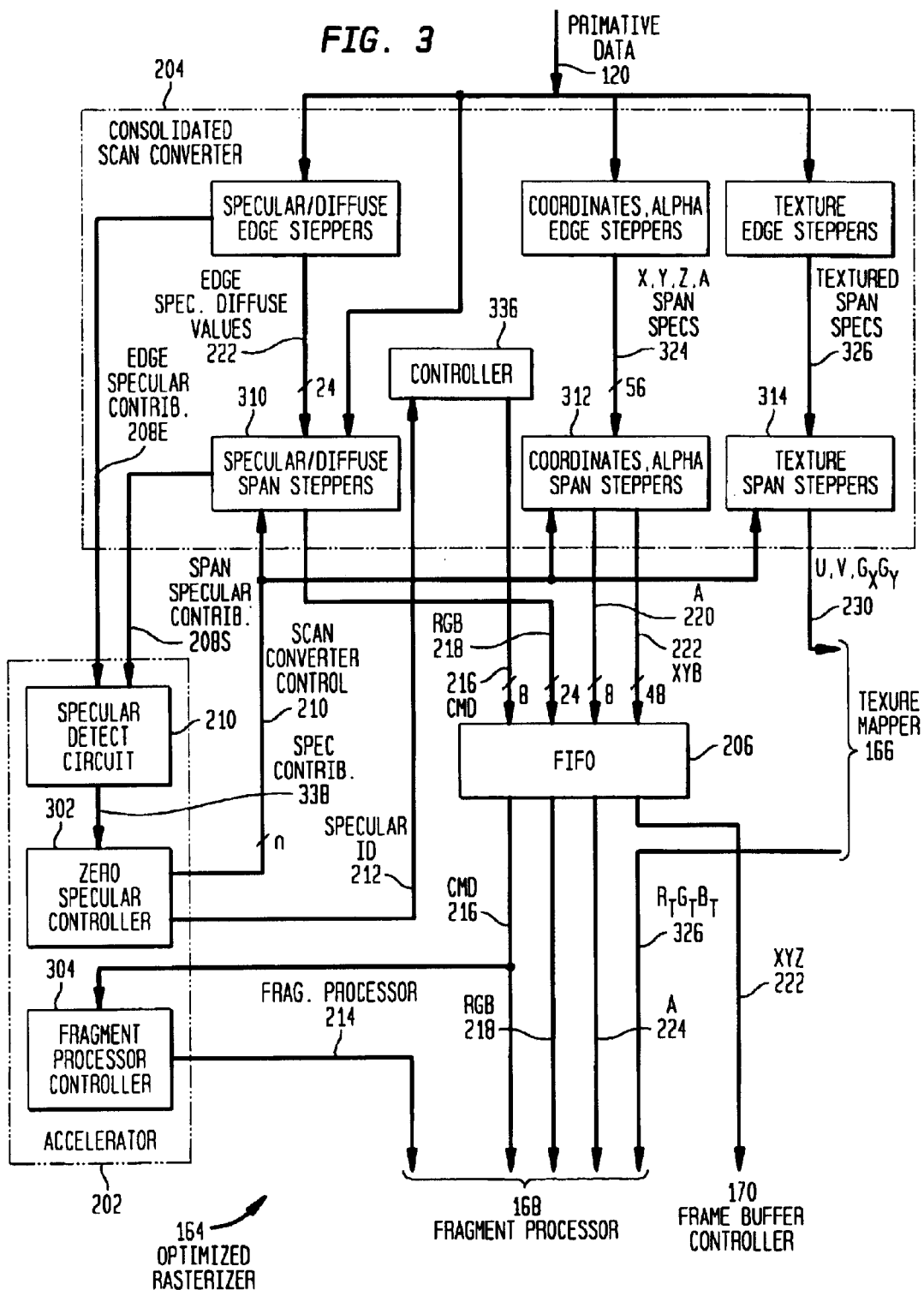
FIG. 3 is a detailed block diagram of one embodiment of the optimized rasterizer illustrated in FIG. 1B.

FIG. 3 is a detailed block diagram of separate specular accelerator 202 and consolidated scan converter 204 in accordance with one embodiment of the present invention. As noted, each primitive is defined by primitive data 120. Primitive data 120 is typically implemented in a form commonly referred to as plane equations. A plane equation defines the distribution of values of a particular component (for example, the red, green and blue specular lighting components) within the primitive. In one embodiment, the plane equations include an initial value for the component at one vertex, and delta values for the component defining the difference between the component values at neighboring pixels along the edge and spans of the vertex. In other embodiments, a final value for the component is also included in primitive data 120.

Consolidated scan converter 204 includes interpolators that utilize the plane equations to generate signals corresponding to the value of each component of the primitive at each fragment within the rendered graphics primitive. In the embodiment illustrated in FIG. 3, consolidated scan converter 204 includes two types of interpolators each of which interpolates primitive components over a particular portion of the primitive: edge steppers and span steppers. Each edge stepper or interpolator 328–334 determines the value of a particular component at each pixel along the edge(s) of the primitive. Each shap stepper or interpolator 310–314 determines the value of a component at each pixel along each span of the primitive. Each span is generally a row of interior pixels bounded by edge pixels.

As noted, a consolidated interpolator to interpolate specular and diffuse lighting components can be implemented for each type of interpolator in scan converter 204. In the embodiment illustrated in FIG. 3, consolidated specular/diffuse edge steppers 328 and a consolidated specular/diffuse span steppers 310 are implemented in consolidated scan converter 204 of rasterizer 164. It should be understood that consolidated scan converter 204 can be implemented with conventional specular and diffuse edge steppers with a consolidated span stepper of the present invention, or with conventional specular and diffuse span steppers with a consolidated edge stepper of the present invention. As noted, there is a red, green and blue component of each lighting component. A single functional block 328 represents the three consolidated specular/diffuse edge steppers while a single functional block 310 represents the three consolidated specular/diffuse span steppers.

In the exemplary embodiment illustrated in FIG. 3, specular/diffuse lighting edge steppers 328 receive the specular and diffuse lighting plane equations in primitive data 120, and generate component edge values 322 for fragments along the edge(s) of the primitive. Component edge values 322 include red, green, and blue specular and diffuse lighting component values for each pixel along each edge of the rendered primitive. In one embodiment, the data path carrying component edge values 322 include 24 lines for carrying 8 bits of information for each of the red, green and blue signals.

Consolidated specular/diffuse span steppers 310 interpolate both, the specular lighting component and the diffuse lighting component across each span of the primitive. Specular/diffuse span steppers 310 receive as an input component edge value 322 generated by consolidated specular/diffuse lighting edge steppers 328. Under the control of controller 336 and accelerator 202 of the present invention, specular/diffuse span steppers 310 utilize the edge component values and primitive data 120 to generate the final RGB color value 218. Further, the details of specular/diffuse edge and span steppers 328, 310 are provided below with reference to an exemplary implementation.

Primitive data 120 also includes plane equations defining the boundaries of the primitive. Coordinate/alpha edge steppers 332 generate XYZA span specifications 324 that identify the coordinates (X, Y, Z) of the endpoints of each edge of the primitive. An alpha value for each pixel along the edge(s) of the primitive is also included in specifications 324. In one embodiment, the data path carrying XYZA span specifications 324 include a total of 56 lines: 48 data lines for carrying 16 bits of information for each of the X, Y, and Z coordinates, and 8 data lines for carrying 8 bits of information for the alpha value. In the illustrative embodiment, primitive data 120 also specifies the texture to be mapped onto the graphics primitive. Texture edge steppers 334 convert the plane equations into signals corresponding to the U and V coordinates of the texture, and X gradient ($G_x$) and Y gradient ($G_y$) information, collectively referred to as texture span specifications 326.

Similarly, there are span steppers 310–314 that interpolate component values across each span of the rendered primitive. These span steppers include specular/diffuse span steppers 310, coordinate, alpha span steppers 312 and texture span steppers 314. Span steppers 312 generate coordinate values 222 and alpha values 220 for the fragment. Texture span steppers 314 generate texture and gradient values 218 for processing by texture mapper 166. Texture mapper 166 subsequently generates texture values 224 for the fragment. The texture values 224 are stored in FIFO 206 with the corresponding RGB, A and XYZ values generated by scan converter 204. As noted, consolidated scan converter 204 controls the rasterization of the diffuse and specular lighting components based on whether the specular lighting component of the graphics primitive is zero. In accordance with one embodiment of the invention, accelerator 202 includes a specular detect circuit 302 for making such a determination for each portion (edge and span) of the primitive being interpolated. In this illustrative embodiment, specular detect circuit 302 receives specular contribution signal(s) 208 (FIG. 2) that is used to determine whether the interpolated edge or span has a non-zero lighting component. Referring to FIG. 3, specular contribution signals 208 include an edge specular contribution signal 208E and a span specular contribution signal 208S. As described further below, specular contribution signals 208 contain or represent the initial and delta specular lighting values for the edge(s) (208E) and span(s) (208S). Should the plane equations defining the distribution of the components over the edge or span not have a specular lighting component; that is, a value of zero, then the individual fragments comprising that edge or span will also not have a specular lighting component. The results of this determination are presented in a specular contribution signal 338 generated by specular detect circuit 302.

As noted, consolidated scan converter 204 implements a single edge stepper 328 and a single span stepper 310 to interpolate each of the red, green and blue components of the diffuse lighting component and the specular lighting component of the graphics primitive to be rendered. Separate specular accelerator 202 includes a zero specular controller 304 that controls whether specular/diffuse edge and span steppers 328, 310 process specular or diffuse lighting components. Controller 304 receives specular contribution signal 338 generated by specular detect circuit 302 and controls scan converter 204 through the generation of scan converter control signal 210. Scan converter control signal 210 controls which of specular or diffuse lighting components is to be processed by specular/diffuse edge and span steppers When specular detect circuit 302 determines that the specular lighting component of any fragment constituting the edge or span of the primitive is greater than zero, controller 304 instructs scan converter 204 to scan convert the diffuse and specular lighting components of the plane equation across that edge or span in two successive processing states per fragment. Specifically, controller 304 generates scan converter control signal 210 in a first clock cycle having a value that causes either the diffuse or specular lighting component to be scan converted by a specified specular/diffuse interpolator 328, 310. This causes the specified specular/diffuse interpolator 328, 310 to ultimately generate an edge or span fragment RGB value corresponding to the selected lighting component of the graphics primitive at a the particular fragments comprising the edge or span in a next clock cycle, zero specular controller 304 generates a scan converter control signal 210 having a value that causes the specified specular/diffuse interpolator 328, 310 to scan convert the other lighting component. This causes the specified specular/diffuse interpolator 328, 310 to ultimately generate an edge or span fragment RGB value corresponding to the selected lighting component of the graphics primitive for that same fragment. Thus, span steppers 310–314 generate a fragment 122 including the specular or diffuse lighting components. The resulting fragment data words 122 are stored in one or two FIFO data words, as described below.

On the other hand, when the specular lighting component of the graphics primitive is zero, controller 304 generates a scan converter control signal 210 having a value that causes span stepper 310 to scan convert only the diffuse lighting component of the graphics primitive in a single processing state. In this way, controller 304 instructs scan converter 204 to rasterize the specular and diffuse lighting components in a one-state mode when the specular lighting component is negligible, and in a two-state mode when the specular lighting component is not negligible. As shown in FIG. 3, RGB 218 is a 24-bit data path.

As noted, accelerator 202 also controls the fragment processing of the fragments stored in FIFO 206. Command 216 generated by zero specular controller 304 is utilized by a fragment processor controller 306 to determine how to manage fragment processor 168. Specifically, in the embodiment described below, zero specular scan controller 304 provides specular ID 212 to scan converter controller 336. In response, scan converter controller 336 sets one or more bits in command 216 generated with each fragment data word 122 to specify whether the corresponding fragment data word 122 contains a specular lighting component. Command 216 is stored with each fragment data word 122 in FIFO 206, indicating whether the corresponding RGB color value 218 represents a specular or diffuse lighting contribution. Command 216 is subsequently used by fragment processor controller 306 to determine how to process the output of FIFO 206 based on whether fragment 122 contains a specular lighting component, or whether fragment 122 is contains both, a specular and a diffuse lighting component.

In one embodiment of the present invention, the output of specular/diffuse interpolator 310 and XYZA interpolator 312 are stored in first-in first-out (FIFO) buffer 206. FIFO buffer 206 stores these values for subsequent processing by fragment processor 168. In addition, an 8-bit command 216 is generated for each fragment. In the illustrative embodiment, FIFO 206 is 128 words deep, with each fragment data word including 83-bits, each of which includes a three-bit command 216, a 24-bit specular/diffuse RGB value 218, an 8-bit alpha value and a 48-bit coordinate value 222. That is, scan converter 204 double-writes each fragment into FIFO 206; one word includes an RGB diffuse value 218 and the other with a specular RGB value 218. Alternatively, each fragment data word 122 can include a 24-bit diffuse RGB value and a 24-bit specular RGB value, for a fragment data word of 107-bits.

Figure 5:
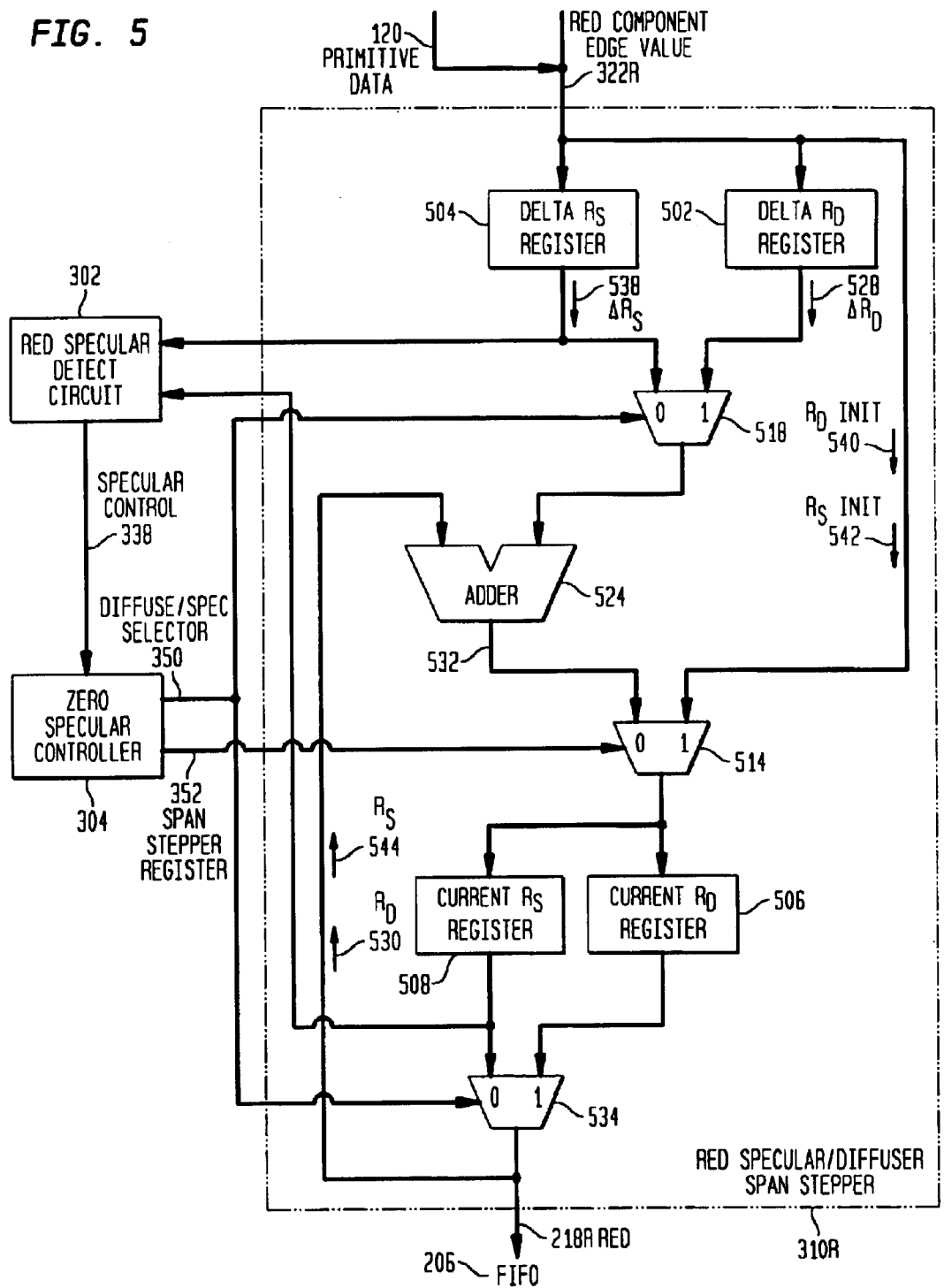
FIG. 5 is a circuit block diagram of a specular/diffuse span stepper illustrating the interface with the zero specular controller illustrated in FIG. 3 in accordance with one embodiment of the present invention.
Figure 6:
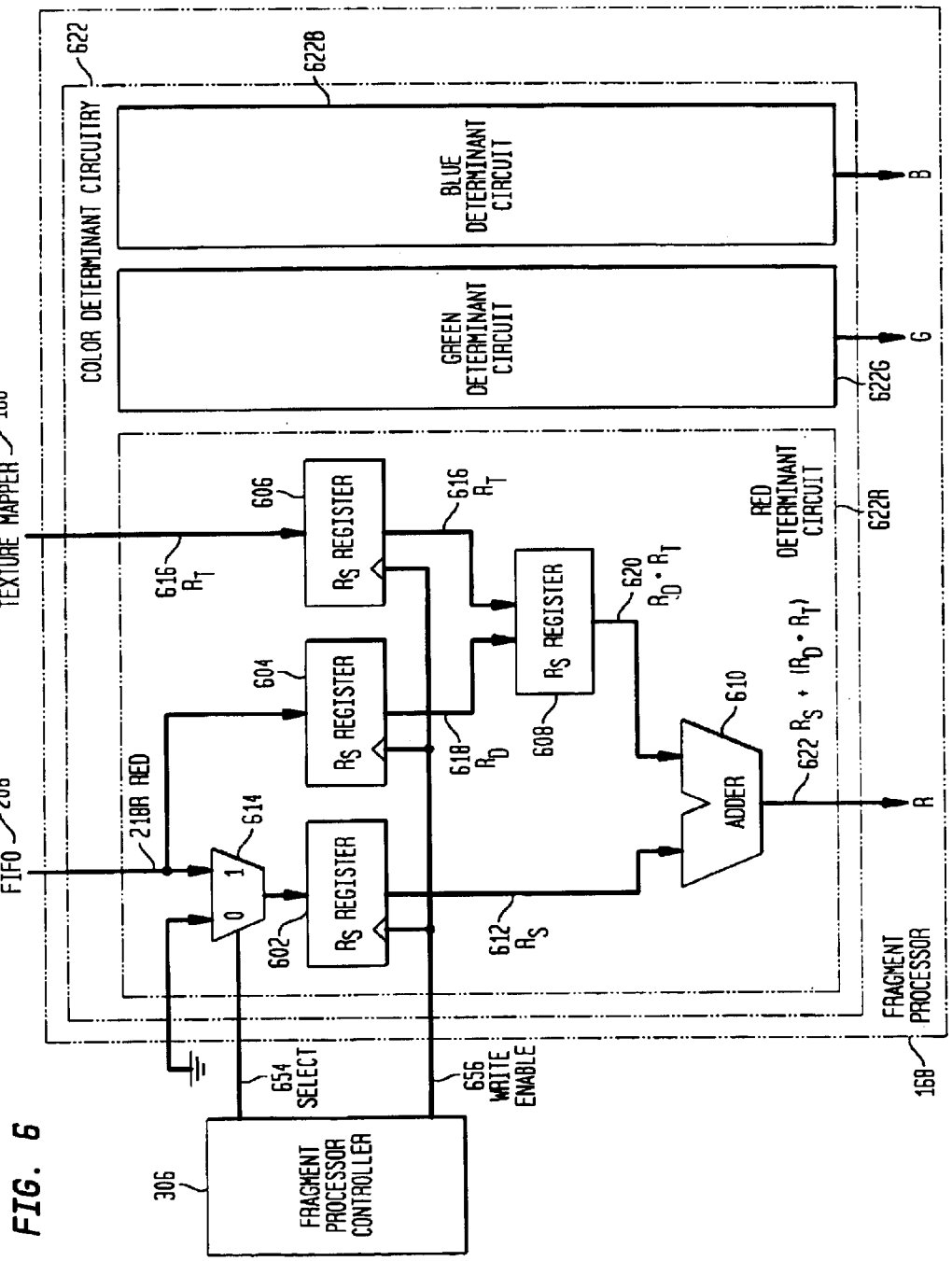
FIG. 6 is a circuit block diagram of the fragment processor illustrating the interface with the fragment operations controller illustrated in FIG. 32 in accordance with one embodiment of the present invention.

Exemplary implementations of each of the components of separate specular accelerator 202 will now be described. As noted, specular and diffuse lighting components consist of a red, blue and green component, each of which is interpolated separately. For brevity, only that portion of edge steppers 328 and span steppers 310 that interpolates the red diffuse and red specular lighting components illustrated. As such, only red specular edge stepper 328R is shown in detail in FIG. 4, only red specular/diffuse span stepper 31 OR is illustrated in FIG. 5, and only red determinant circuit 622R is illustrated in FIG. 6.

A. Specular/Diffuse Lighting Edge Steppers

Figure 4:
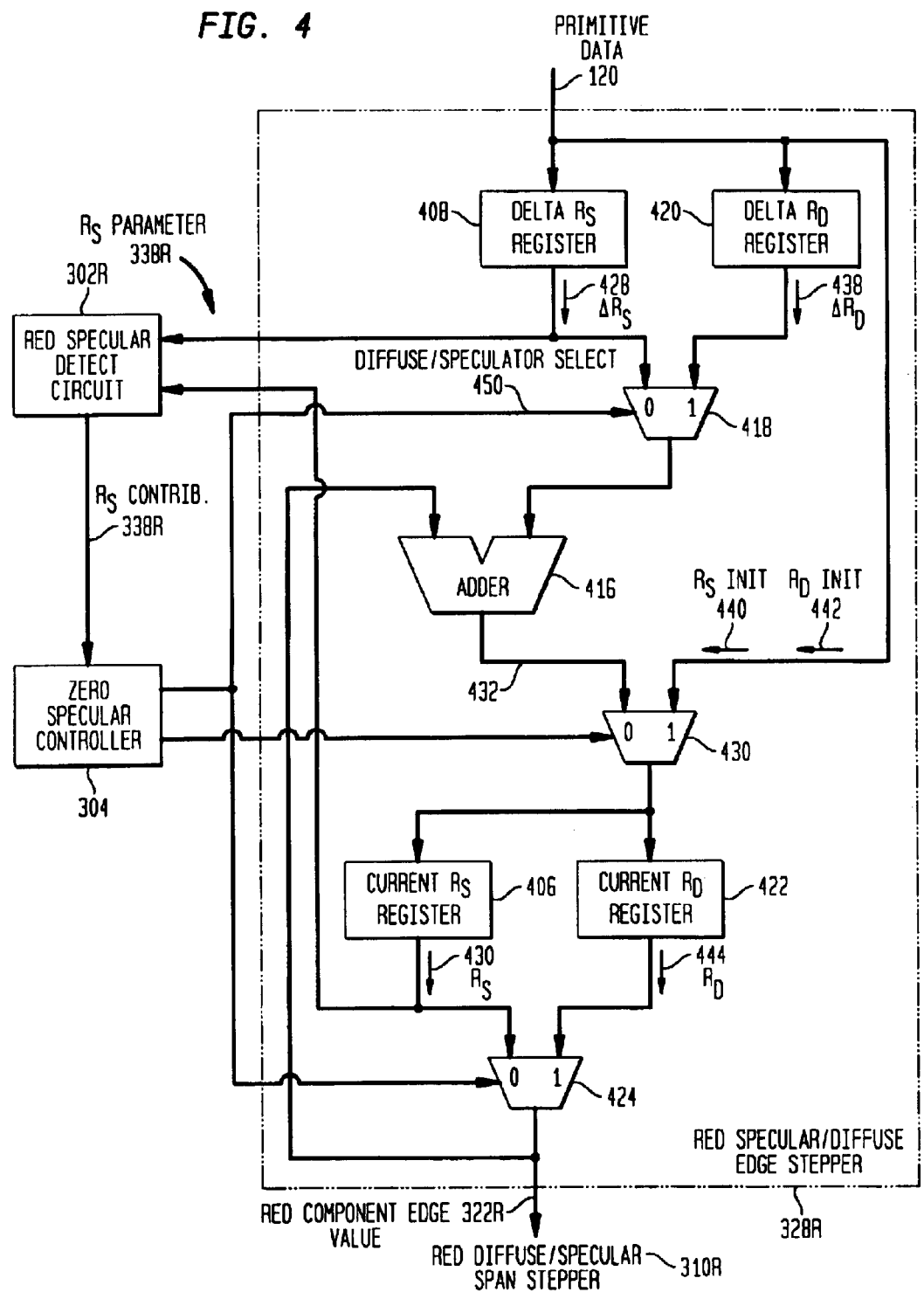
FIG. 4 is a circuit block diagram of a red specular edge stepper illustrating the interface with red specular detector illustrated in FIG. 3 in accordance with one embodiment of the present invention.

FIG. 4 is a circuit block diagram of one embodiment of a specular/diffuse edge stepper 328. Also illustrated in FIG. 4 is a portion of specular parameter detect circuit 302 and zero specular controller 304 which interface with the exemplary specular edge stepper 328 in accordance with one embodiment of the present invention. In general, detect circuit 302 receives a specular parameter 208 from edge stepper 328 indicating whether the plane equations define a vertex with a specular lighting component. Based on the value of specular parameter 208, detect circuit 302 generates a specular contribution signal 338 that is then used by zero specular controller 304 as described below. One embodiment of specular parameter detect circuit 302 and zero specular controller 304 will now be described with reference to FIG. 4. It should be understood that specular/diffuse lighting edge steppers 328 include a red specular edge stepper 328R, a blue specular edge stepper and a green specular edge stepper. These edge steppers 328 together generate red specular light span specification 322S comprising the individual RGB color components. In this description, only those aspects of the invention pertinent to red specular edge stepper 328R are described. It is understood that this description can be applied to the other consolidated edge steppers as well.

Referring now to FIG. 4, consolidated specular/diffuse interpolator 328R includes a delta red specular ($R_S$) register 408 and a delta red diffuse ($R_D$) register 420. These registers receive and store an incremental value for the respective lighting component that is to be used by interpolator 328R. Also included in span stepper 328R is a current $R_S$ register 406 and current $R_D$ register 422. Each of these registers stores a current value of the respective red color component for each pixel across a designated edge.

A single adder 416 is included in interpolator 328R to add the delta and current values for whichever red lighting component is currently being interpolated by interpolator 328R. Adder 416 has a first input connected to delta registers 408 and 420 through a multiplexer 418. At this input, adder 416 receives delta red specular value 428 stored in delta red specular register 408 or delta red diffuse value 438 stored in delta red diffuse register 420. Adder 416 has a second input connected to current registers 406 and 422 through a multiplexer 424. At this input, adder 424 receives current red specular value 430 stored in current red diffuse register 406 or current red diffuse value 444 stored in current red diffuse register 422. Multiplexers 418 and 424 are controlled by zero specular controller 304 as described below.

The value input to current $R_S$ and current $R_D$ registers 406 and 422 are controlled by multiplexer 430. The output of adder 416 is provided to the zero input of multiplexer 430 through data path 432. At this input adder 416 will provide either delta or current red specular (428, 430) or red diffuse (438, 444) values. The "one" input of multiplexer 430 is connected to the input of edge stepper 328R. At this input, multiplexer 430 receives either initial red specular value 440 or initial red diffuse value 442. Thus, multiplexer 430 is utilized to store either the initial values 440, 442 or currently calculated values in current red specular and red diffuse registers 406, 422. Multiplexer 430 is controlled by zero specular controller 304 as described below.

The output of multiplexer 424 is also provided to red specular/diffuse span stepper 310R. Thus, either the current red specular value 430 or the current red diffuse value 444 is generated as an output value by red specular/diffuse span stepper 328R. As shown in FIG. 4, this value is referred to as red component edge value 322R, introduced above with reference to FIG. 3.

As noted with reference to FIG. 2, separate specular accelerator 202 generates scan converter control signal(s) 210 to control the operations of consolidated scan converter 204. In the embodiment illustrated in FIG. 4, scan converter control signals 210 include two individual signals for controlling red specular/diffuse edge stepper 328R. A select signal 450 is embodied in a multiplexer select signal and controls multiplexers 418 and 424. Zero specular controller 304 sets the value of select signal 450 to control whether span stepper 328R interpolates the red diffuse or the red specular lighting component. Specifically, a logical one causes edge stepper 328R to interpolate the red specular lighting component; a logical zero, the red diffuse lighting component. The second signal, register control 452, is also embodied in a multiplexer select signal, controlling multiplexer 4320. Zero specular controller 304 sets the value of select signal 452 to control the initial storage of the initial values 440, 442 into current red diffuse and current red specular registers 406, 422.

Generally, in operation, zero specular controller 304 receives red specular contribution 338R indicating whether primitive data 120 includes a red specular contribution. If not, then controller 304 controls edge stepper 328R to interpolate the red diffuse lighting component only. Controller 304 resets data select signal 450 to multiplexers 418 and 424 to select the signal presented at their respective zero inputs. Interpolator 328R retrieves initial red diffuse lighting value 442. Zero specular controller 304 sets edge stepper register control 452, causing multiplexer 430 to advance the signal presented at its logic 1 input. As a result, initial red diffuse value 442 is stored in current red diffuse register 422. The storage of values in the registers is also controlled by write enable signals (not shown) also controlled by zero specular controller 304.

Interpolator 328R then retrieves delta red diffuse lighting parameter 438. Delta red diffuse lighting parameter 438 is stored directly in delta red diffuse register 420. Zero specular controller 304 resets edge stepper register control signal 452, preventing that same value from being stored in current red diffuse register 422. Then, under the normal control of scan converter controller 336, span stepper 310 repeatedly adds current red diffuse value 430 and delta red diffuse value 428 to generate a new current red diffuse value 430. The current red diffuse value is stored in current red diffuse register 406. Since multiplexer 418 is controlled by data select signal 450, for each step across an edge taken by edge stepper 328R, multiplexer 424 provides current red diffuse values 444 to FIFO 206 as red component edge value 322R.

When red specular contribution signal 338 has a value that indicates that primitive data 120 includes a red specular contribution, then controller 304 controls edge stepper 328R to process separately the red diffuse lighting component and the red specular lighting component. In this illustrative embodiment, the red diffuse lighting component is processed prior to the red specular lighting component; however, this is arbitrary and the diffuse and specular components can be processed in any sequence.

Controller 304 sets data select 450 and span stepper register control 452 as noted above to process the red diffuse lighting parameter. Then, controller 304 sets data select signal 450 to cause multiplexers 418 and 424 to select the signal presented at their respective one inputs. Interpolator 328R then retrieves initial red specular lighting parameter 440. Zero specular controller 304 sets span stepper register control 452, causing multiplexer 430 to advance the signal presented at its logical 1 input. As a result, red specular initial value 442 is stored in current red specular register 406.

Delta red specular lighting component value 428 is then retrieved and stored directly in delta red specular register 408. Zero specular controller 304 resets span stepper register control signal 452, preventing that same value from being stored in current red specular register 406. Then, under the normal control of scan converter controller 336, span stepper 328R repeatedly adds current red specular value 434 with delta red specular value 428 to generate a new current red specular value 430. The current red specular value 430 is stored in current red specular register 406. Since multiplexer 424 is controlled by data select signal 450, for each step taken by edge stepper 328R, multiplexer 424 provides current red specular values 430 to red specular/diffuse span stepper 310R as red component edge value 322R.

This process of adding the delta values 428, 438 to the current values 430, 444 and presenting the sum as edge value 322R continues in alternative fashion for each fragment until the edge has been interpolated. Then the entire process is repeated for the next edge, if any. This process is repeated until all edges in the graphics primitive have been interpolated.

It should be appreciated that specular/diffuse edge stepper 328R includes a single adder 416. This provides significant space savings as compared with the conventional approach of implementing two interpolators to perform the same interpolation operations. Each such conventional interpolator includes a single adder. Thus, the present invention reduces the implemented circuitry by one adder while adding a number of multiplexers to route the diffuse and specular lighting component values through edge stepper 328R. Because adders are relatively large circuit components, elimination of an adder constitutes a significant space savings. This savings is achieved in each of the three interpolators of the present invention (red, green, and blue interpolators 328), further compounding the amount of space saved.

B. Specular/Diffuse Span Stepper 310

FIG. 5 is a circuit block diagram of one embodiment of a portion of specular/diffuse span stepper 310 illustrating an exemplary circuit implementation and interface between span stepper 310, zero specular controller 304 and red specular detect circuit 302. As noted, zero specular controller 304 controls certain aspects of span steppers 310 to perform the functions of the present invention. Consistent with the prior descriptions, the following description is limited to those features of specular/diffuse span stepper 310 that interpolate the red color component of the specular and diffuse lighting. Accordingly, only that portion of span stepper 310 that interpolates the red diffuse and red specular color components along a span is illustrated. As such, the span stepper illustrated in FIG. 5 is referred to herein as red specular/;diffuse span stepper 310R or, more simply, span stepper or interpolator 310R. Specular/diffuse span stepper 310 is a single, consolidated interpolator that interpolates both, the diffuse or specular lighting component across a designated span of a primitive.

As sown in FIG. 5, red specular/diffuse span stepper 310R receives as inputs red component edge value 322R and primitive data 120. Red component edge value 322R is the initial fragment value for the span. Primitive data 120 includes the delta value for the red specular and red diffuse component values. Thus, red specular/diffuse span stepper 310R receives intial and delta values, and utilizes these values to interpolate the red specular component across each designated primitive span. This, the function and operation of red specular/diffuse span stepper 310R is similar to red specular/diffuse edge stepper 328R described above.

In those circumstances in which span stepper 310R interpolates both lighting components, the initial and current values are stored in internal registers and are used to interpolate both lighting components for each fragment across the span. In the illustrative embodiment, both values are interpolated for each fragment in succession. Thus, span stepper 310 traverses a span once, with each fragment requiring two processing states to be processed. There are a number of mutliplexers included in span stepper 310R to control the transfer and storage of red specular and red diffuse lighting components through span stepper 310R. The multiplexers are controlled by zero specular controller 304. As noted, zero specular controller 304 generates scan converter control signals 210 to control scan converter 204. As shown in FIG. 5, scan converter control signals 210 include two signals to control span stepper 310R, diffuse specular select signal 550 and span stepper register 552, both of which control multiplexers of span stepper 310R as described below.

As shown in FIG. 5, consolidated specular/diffuse interpolator 310R includes a delta red diffuse ($R_D$) register 502 and a delta red specular ($R_S$) register 504. These registers receive and store an incremental value for the respective lighting component that is to be used by interpolator 310R. Also included in span stepper 310R is a current $R_D$ register 506 and current $R_S$ register 508. Each of these registers stores a current value of the respective color component for each pixel across a designated span.

A single adder 524 is included in interpolator 310R to add the delta and current values for whichever lighting component is currently being interpolated by interpolator 310R. Adder 524 has a first input connected to delta registers 502, 504 through a multiplexer 518. At this input, adder 524 receives delta red diffuse value 528 stored in delta red diffuse register 502 or delta red specular value 538 stored in delta red specular register 504. Adder 524 has a second input connected to current registers 506, 508 through a multiplexer 534. At this input, adder 524 receives current red diffuse value 530 stored in current red diffuse register 506 or current red specular value 544 stored in current red specular register 508. Multiplexer 534 is controlled by zero specular controller 304 as described below.

The value input to current $R_D$ and current $R_S$ registers 506, 508 is controlled by multiplexer 514. The output of adder 524 is provided to the zero input of multiplexer 514 through data path 532. At this input adder 524 will provide either delta or current red diffuse (528, 530) or red specular (538, 544) values. The "one" input of multiplexer 514 is connected to multiplexer the input of red specular/diffuse span stepper 310R. At this input, multiplexer 514 receives either initial red diffuse value 540 or initial red specular value 542. Thus, multiplexer 514 is utilized to store either the initial values 540, 542 or currently calculated value in current red diffuse and red specular registers 506, 508. Multiplexer 514 is controlled by zero specular controller 304 as described below.

The output of registers 506, 508 are also coupled to a multiplexer 534. Here, the current red diffuse ($R_D$) value 530 and the current red specular ($R_S$) value 544 are provided to the "zero" and "one" inputs, respectively, of multiplexer 534. Thus, either the current for red specular value or the current red diffuse value is generated as an output value by red specular/diffuse span stepper 310R. As shown in FIG. 5, this value is referred to as red lighting component 218R, introduced above with reference to FIG. 2. Multiplexer 534 is controlled by zero specular controller 304 as described below.

As noted, span converter control signal(s) 210 include two individual signals for controlling red specular/diffuse span stepper 310R. The data select signal 550 is embodied in a multiplexer select signal and controls multiplexers 518 and 534. Zero specular controller 304 sets the value of select signal 550 to control whether span stepper 310R interpolates the red diffuse or the red specular lighting component. Specifically, a logical one causes span stepper 310R to interpolate the red specular lighting component; a logical zero, the red diffuse lighting component. The second signal, span stepper register 552, is also embodied in a multiplexer select signal, controlling multiplexer 514. Zero specular controller 304 sets the value of select signal 552 to control the initial storage of the initial values 540, 542 into current red diffuse and current red specular registers 506, 508. Thereafter, multiplexer 514 are controlled so that registers 506, 508 are connected to the input of specular/diffuse span stepper 310R.

Generally, in operation, zero specular controller 304 receives specular contribution signal 338 indicating whether the plane equations defining the interpolated span includes a red specular contribution. If not, then controller 304 controls span stepper 310R to interpolate the red diffuse lighting component only. Controller 304 resets data select signal 550, causing multiplexers 518 and 534 to select the signal presented at their respective zero inputs. Interpolator 310R retrieves initial red diffuse lighting parameter 540. Zero specular controller 304 sets span stepper register control 552, causing multiplexer 514 to advance the signal presented at its logical 1 input. As a result, initial red diffuse value 540 is stored in current red diffuse register 506. The storage of values in the registers is also controlled by write enable signals (not shown) also controlled by zero specular controller 304.

Interpolator 310R then retrieves delta red diffuse lighting parameter 528. Delta red diffuse lighting parameter 528 is stored directly in delta red diffuse register 502. Zero specular controller 304 resets span stepper register control signal 552, preventing that same value from being stored in current red diffuse register 506. Then, tinder the normal control of span converter controller 336, span stepper 310 repeatedly adds current red diffuse value 530 and delta red diffuse value 528 to generate a new current red diffuse value 530. The current red diffuse value is stored in current red diffuse register 506. Since multiplexer 534 is controlled by data select signal 550, for each step across a span taken by span stepper 310R, multiplexer 534 provides current red diffuse values 530 to FIFO 206 as red color parameter 218R.

When specular contribution 338 indicates that primitive data 120 includes a red specular contribution, controller 304 controls span stepper 310R to process separately the red diffuse lighting component and the red specular lighting component. In this illustrative embodiment, the red diffuse lighting component is processed prior to the red specular lighting component; however, this is arbitrary and the diffuse and specular components can be processed in any sequence.

Controller 304 sets data select 550 and span stepper register control 552 as noted above to process the red diffuse lighting parameter. Then, controller 304 sets data select signal 550 to cause multiplexers 518 and 534 to select the signal presented at their respective logical one input. Interpolator 310R the retrieves initial red specular lighting parameter 542. Zero specular controller 304 sets span stepper register control 552, causing multiplexer 514 to advance the signal presented at its logical 1 input. As a result, red specular initial value 542 is stored in current red specular register 508.

Delta red specular lighting parameter 538 is then retrieved and stored directly in delta red specular register 504. Zero specular controller 304 resets span stepper register control signal 552, preventing that same value from being stored in current red specular register 506. Then, under the normal control of scan converter controller 336, span stepper 310R repeatedly adds current red specular value 544 with delta red specular value 538 to generate a new current red specular value 538. The current red specular value is stored in current red specular register 508. Since multiplexer 534 is controlled by data select signal 550, for each step taken by span stepper 310R, multiplexer 534 provides current red specular values 530 to FIFO 206 as red color parameter 218R.

This process of adding the delta values 528, 538 to the current values 530, 544 and presenting the sum as red output signal 218R continues in alternative fashion for each fragment until the end of the span is reached. Then edge steppers 328–334 advance to the next span of the primitive and the entire process is repeated for that span. This process is repeated until all spans in the graphics primitive have been interpolated. The resulting fragment data stored in FIFO 206 is described below.

It should be appreciated that specular/diffuse span stepper 310R includes a single adder 524. This provides significant space savings as compared with the conventional approach of implementing two interpolators to perform the same interpolation operations. Each such conventional interpolator includes a single adder. Thus, the present invention reduces the implemented circuitry by one adder while adding a number of multiplexers to route the diffuse and specular lighting component values through span stepper 310R. Because adders are relatively large circuit components, elimination of an adder constitutes a significant space savings. This savings is achieved in each of the three interpolators of the present invention (red, green, and blue interpolators 310), further compounding the amount of space saved.

It should also be appreciated that specular lighting span specification data 320 and diffuse lighting span specification data 322 may take on any number of forms other than that presented above. For example, in alternative embodiments, initial and delta values with starting pixel location and number of pixels in the specified span are included. In an alternative embodiment, the starting and ending points of the specified span are provided. As one or ordinary skill in the art would find apparent, the structure and operation of span steppers 310 may be modified to accommodate such different formats and data content to separately and successively interpolate each lighting component for each fragment across a span of the rasterized primitive.

It should also be apparent to those of ordinary skill in the art that the above circuit description can be used to implement embodiments of the present invention in the described circuitry. Zero specular controller 304 may be implemented in any known manner now or later developed to generate data select signal 550 and span stepper register controller signal 552 based on the state of specular contribution signal 338. For example, the controller 304 can be implemented in an ASIC, firmware, etc., or in some combination of hardware and firmware.

C. Fragment Processor 168 and Fragment Processor Controller 306

As noted, certain embodiments of rasterizer accelerator 202 include a fragment processor controller 306. Controller 306 controls fragment processor 168 to process the diffuse and specular lighting components of a fragment when such components are included in two separate fragment data word 122. FIG. 6 is a schematic block diagram of one embodiment of fragment processor 168 illustrating the interface between processor 168 and fragment processor controller 306.

Fragment processor 168 includes color determinant circuitry 622 that determines the final color value of each fragment that is processed in fragment processor 168. Color determinant circuitry 622 includes red color determinant circuitry 622R, green color determinant circuitry 622G and blue color determinant circuitry 622B. As with the other figures, the portions of fragment processor 168 relative to the red color component are illustrated in detail and described below. Accordingly, only red determinant circuitry 622R is shown in detail in FIG. 6. It is considered to be within the purview of those of ordinary skill in the art to extend this disclosure to implement the present invention in these and other portions of fragment processor 168.

As noted, fragment processor 168 receives RGB color components 218 from FIFO 206. In FIG. 6, red color component, $R_D$ 218R, is received by red color component circuitry 622R. Also noted above, FIFO 206 stores a command 216 in association with each fragment data word 120. Command 216 is the vehicle by which controller 306 is notified as to the contents of each fragment data word 120 that is to be processed by fragment processor 168. A fragment can be represented by a single fragment data word 120 containing a diffuse lighting component or by two fragment data word 122, one containing a diffuse lighting component value and the other containing a specular lighting component value. Color determinant circuit 622 requires a single processing state to process the former, and two processing states to process the latter.

Prior to describing red determinant circuitry 622R in detail, the format of fragment data word 120 and command 216 will be described. FIG. 7 is an illustration of one embodiment of command 216. FIG. 8 is a diagram of FIFO 206 having stored therein commands 216 indicating whether the associated fragment data includes diffuse or specular lighting components.

Referring to the embodiment illustrated in FIG. 7, command 216 is a binary coded 3-bit command, although any format may be used. The 3-bit content 702 and a description 704 of those contents are illustrated. Of the commands illustrated, three are of particular relevance to the embodiment of the present invention illustrated in FIG. 8. In that embodiment, scan converter 204 double-writes fragment data word 122 into FIFO 206 when a fragment has a specular lighting component. That is, two data words 122 are written successively into FIFO 206 for each fragment.

Command 708, having a value of binary 001, indicates that the associated fragment data word 120 has a diffuse lighting component only ("Diffuse only 3D pixel"). When a fragment includes both diffuse and specular lighting components, then a fragment data word 120 with an associated command 718 having a value of binary 110 is provided to fragment processor 168. This command indicates that the represented fragment has both, a diffuse and specular lighting component, and that the diffuse lighting component is included in the associated fragment data word 120 ("3D Pixel diffuse component"). Thus, the previous or next successive data word includes the corresponding specular lighting component. Similarly, the previous or subsequent fragment data word 120 provided to fragment processor 168 has an associated command 720 indicating that the associated fragment data word 120 includes the red specular lighting component and that this fragment is one or two fragment data words defining the contents of a fragment ("3D pixel specular component"). Returning to FIG. 3, scan converter controller 336 generates command 216 in as is well known in the art. In accordance with the present invention, controller 336 considers specular identifier 212 generated by zero specular controller 304 in addition to other values and conditions traditionally considered. Controller 336 generates command 216 with the other values generated by scan converter 204, including RGB 218, alpha 220 and coordinates 222. Referring to FIG. 8, FIFO 206 has stored therein fragment data word 122 representing 5 fragments. The first three fragment data word 122A–122C represent fragments with a diffuse lighting component only. Accordingly, each fragment data word 120 represents a fragment. The last four fragment data word $122N_S$–$122M_D$ represent a fragment with a diffuse and specular lighting component. Accordingly, two fragment data words represent each fragment. Specifically, fragment data word $122N_S$ and $122M_D$ represent one fragment, with data word $122N_S$ containing the specular lighting component value and data word $122N_D$ containing the diffuse lighting component value for that fragment. Similarly, fragment data word $122M_S$ and $122M_D$ represent one fragment, with data word $122M_S$ containing the specular lighting component value and data word $122M_D$ containing the diffuse lighting component value for that fragment. It should be understood that other embodiments of FIFO 206 are preferable in other applications. For example, in one embodiment of the present invention, scan converter 204 writes RGB value 218 having a specular lighting component into one 24-bit region of FIFO 206 and an RGB value 218 having a diffuse lighting component into a different 24-bit region of FIFO 206. In such an embodiment, each fragment data word 122 includes a 24-bit diffuse RGB value and a 24-bit specular RGB value, for a fragment data word of 107-bits. In such an embodiment, the commands 216 illustrated in FIG. 7 would be altered to identify the different types of fragment data words.

Returning to FIG. 6, circuitry 622R includes three input registers. A red specular input register 602 receives red specular color component 612. A red diffuse register 604 receives red diffuse color component 618. Both of these values are retrieved from FIFO 206. In addition a red texture register 606 receives red texture component 616 retrieved from texture mapper 166. Controller 306 generates write enable signals 654 to control the writing of data into registers 602, 604 and 606.

A multiplexer 614 has an input connected to FIFO 206 to receive red color component 218R. As noted, this may be the red specular lighting component or the red diffuse lighting component. A second input of multiplexer 614 is grounded, providing a null data word to this input of multiplexer 613. The output of multiplexer 614 is provided to red specular input register 602. Multiplexer 614 is controlled by controller 306 as described below. Red diffuse register 604 is also connected to FIFO 206 to receive directly red color component 218R. Thus, only a red color component 218R provided by FIFO 206 is stored in red diffuse register 604. On the other hand, the same red color component 218R or zero data word is stored in red specular register 602.

A multiplier 608 receives a red diffuse color component 618 from red diffuse register 604, and a red texture component 616 from red texture register 606. Multiplier 608 generates a product 620 of these two values ($R_T*R_D$), which is provided to one input of an adder 610. The second input of adder 610 is connected to red specular register 602 to receive the red specular color component 612 stored therein. The output of adder 610, then, is the final red color value: $R_S+(R_T*R_D)$.

In this illustrative embodiment, controller 306 controls the manner in which red specular component 612 and red diffuse component 618 are written into input registers 602 and 604 of red determinant circuitry 622R. As noted, fragment operations controller 306 receives, as part of fragment data 120, command 216 corresponding to the fragment data 120 that is to be processed by fragment processor 168. Command 216 includes information used by fragment processor 168 in a well-known manner. In addition, command 216 includes information indicating whether the associated fragment data word 120 includes a specular lighting component or a diffuse lighting component, and whether a fragment includes both lighting components located in two consecutive data words 120. Based on this information, fragment operations controller 306 controls color determinant circuitry 622. As noted, when there is only a red diffuse lighting component, the associated fragment is to be processes in a single processing state, and when there is a red diffuse and specular lighting component, the associated fragment is processed in two successive processing states.

In operation, when the fragment data word 120 includes only diffuse lighting, red color component 218R is a red diffuse color value 618, and command 216 has a value of binary 001. In response, controller 306 resets select signal 654 to cause multiplexer 614 to present zero data to red specular register 602. Controller 306 also asserts a write enable signal 656 to cause all three registers to store the data presented at their respective inputs. Red specular register 602 stores zero data, red diffuse register 604 stores red color component 218R and red texture register 606 stored red texture component 616. Multiplier 608 multiplies $R_D$ 618 stored in red diffuse register 604 and $R_T$ stored in red texture register 606 to generate a product term 618 ($R_T*R_D$). This value is added to the value stored in red specular register 602 which, as noted, is zero. Thus, the output of adder 610 is $R_T*R_D$.

When the fragment includes diffuse and specular lighting components, red color component 218R of the first fragment data word is, for example, a red diffuse color value 618, and command 216 has a value of binary 110. In response, controller 306 asserts a write enable signal 656 to cause red diffuse register 604 and red texture register 606 to store the data presented at their respective inputs. Red diffuse register 604 stores red color component 218R and red texture register 606 stored red texture component 616.

Upon receipt of the second fragment data word 120, red color component 218R is a red specular color value 612, and command 216 has a value of binary 111. In response, controller 306 sets select signal 654 to a value that causes multiplexer 614 to present red color component 218R to red specular register 602. Controller 306 also asserts a write enable signal 656 to cause red specular register 602 to store red color component 218R.

Multiplier 608 multiplies $R_D$ 618 stored in red diffuse register 604 and $R_T$ stored in red texture register 606 to generate a product term 618 ($R_T*R_D$). This value is provided to adder 610. Adder 610 is also presented with $R_S$ 612 stored in red specular register 602. This value is added to product term ($R_T*R_D$) 618, resulting in a final red color value of $R_S+(R_T*R_D)$.

Thus, the final color value accurately considers the diffuse and specular lighting components by processing them separately and successively. When there is a specular lighting component, the final color value separately includes its contribution in the value $R_S+(R_T*R_D)$, and, in the more common circumstance, when there is no specular lighting component, the final color value does not include its contribution in $R_T*R_D$. The resulting rendered image, thus, accurately represents the specular lighting component under the noted circumstances of a dim or shaded dark surface. In such circumstances, the term $R_T$ is zero. When there is no specular lighting contribution, the value final color value, $R_T*R_D$, is also zero. On the other hand, when there is a specular lighting component, the final color value, $R_S+(R_T*R_D)$, will be $R_S+0$, or $R_S$. Thus, the specular lighting component is properly be considered in an image rendered in accordance with the present invention.

It should also be apparent to those of ordinary skill in the art that the above circuit description of fragment processor controller 306 can be used to implement embodiments of the present invention using well-known circuit components, in an ASIC, firmware, etc., or in any combination thereof. Furthermore, it should be understood that the described fragment processor 168 is illustrative only and that other compositing models may be implemented.

It should be understood that there are a myriad of approaches that can be implemented to control the operation of fragment processor 168 based on whether the fragment includes a diffuse or specular lighting component. For example, in one alternative embodiment, red color component 219R is written into both registers 602, 604 at all times, with a zero data word being written into the appropriate register based on the contents of command 216. Effectively, any number of techniques can be used to identify and separate the red specular lighting component 218R that represents the diffuse lighting component from the values that represent the specular lighting component. It should also be appreciated that fragment processor controller 306 can be implemented in minimal amount of circuitry, or an ASIC, and that such implementations are considered to be apparent to those of ordinary skill in the art.

As noted, an advantage of the present invention is that it provides a significant savings in rasterizer circuitry while insuring that all object surfaces, including those that have a low color intensity, properly reflect the contribution of specular lighting, if any. These significant advantages are provided at an expense of reducing minimally the responsiveness of the implementing graphics system. For example, in the noted exemplary embodiment, the present invention reduces the requisite size of FIFO 206 used in rasterizer 164 approximately 128 words (depth) by 24bits (8 each of red, green and blue for specular lighting). This is a reduction in FIFO size of approximately 20% over conventional graphics system rasterizers. As is well known to those of ordinary skill in the art, the of the many circuit components that are typically implemented in a graphics system rasterizer, FIFOs consume considerable, and relatively large surface area. Accordingly, a reduction of the size of the FIFO on the order of that noted above is a significant advantage of the present invention.

While various embodiments of the present invention have been described above, it should be understood that they have been presented by way of example only, and not limitation. For example, the specular lighting component value considered to be negligible in the above example was zero. It should be apparent to those of ordinary skill in the art that other specular lighting component threshold values can be used. It should also be understood that a corresponding change in detect circuit 302 may be necessary to determine whether a threshold value other than zero would occur along the interpolated portion of the primitive. Thus, the breadth and scope of the present invention should not be limited by any of the above-described exemplary embodiments, but should be defined only in accordance with the following claims and their equivalents.

What is claimed is:

1. A scan converter for scanning edge and span portions of a graphics primitive to convert the primitive to fragments in a rasterized form of the primitive, the scan converter comprising:

at least one interpolator each of which is configured to calculate diffuse and specular lighting component values at each fragment of an edge or span portion of the primitive, wherein for each edge or span portion of the primitive that has a non-negligible specular lighting component, each interpolator which is to interpolate fragments of that edge or span portion separately calculates the diffuse and specular lighting component values at each such fragment of that edge or span portion of the primitive.

2. The scan converter of claim 1, wherein the at least one interpolator comprises:

at least one first interpolator each constructed and arranged to calculate diffuse and specular lighting component values of each edge portion of the primitive; and at least one second interpolator each constructed and arranged to calculate diffuse and specular lighting component values of each span portion of the primitive.

3. The scan converter of claim 1, wherein the scan converter is an element of a rasterizer that further comprises:

a separate specular accelerator that determines the specular lighting component value at each edge and span portion of the primitive, and that commands each at least one interpolator which is to interpolate an edge or span portion of the primitive having a non-negligible specular lighting component, to separately calculate in successive processing states the diffuse and specular lighting component values for of each fragment of that portion of the primitive.

4. The scan converter of claim 3, wherein the rasterizer is an element of a graphics system further comprising:

a frame buffer; and a fragment processor constructed and arranged to generate pixel data to be written into the frame buffer for subsequent rendering on a display device, wherein the fragment processor is responsive to commands generated by the rasterizer, each command indicating whether a corresponding fragment data word includes a non-negligible specular lighting component value.

5. The scan converter of claim 4, wherein the pixel data generated by the fragment processor includes a color value for each fragment, wherein the color value is set equal to the product of the diffuse lighting component value and a texture component value of the fragment when the fragment includes a negligible specular lighting component value, and wherein the color value is set equal to the sum of the specular lighting component and the product of the diffuse lighting component value and the texture component value of the fragment when the fragment includes a non-negligible specular lighting component value.

6. The scan converter of claim 1, wherein when an edge or span portion of the primitive includes a negligible specular lighting component, the at least one interpolator calculates only the diffuse lighting component for each fragment of that edge or span portion of the primitive.

7. The scan converter of claim 1, wherein at least one fragment is represented by a plurality of fragment data words each comprising data defining a corresponding pixel of the rasterized form of the primitive.

8. The scan converter of claim 7, wherein the plurality of fragment data words comprises:

a first data word comprising the diffuse lighting component value of the represented fragment; and a second data word comprising the specular lighting component value of the represented fragment.

9. The scan converter of claim 1, wherein each at least one interpolator is a circuit comprising:

delta specular and delta diffuse registers adapted to store an incremental value for the respective specular and diffuse lighting component at each fragment of an edge or span portion of the primitive;

current specular and current diffuse registers adapted to store a current value of the respective specular and diffuse lighting component for each fragment of an edge or span portion of the primitive;

an adder circuit having a first input connected to the delta specular and delta diffuse registers through a first multiplexer, and a second input connected to the current specular and current diffuse registers through a second multiplexer, wherein the adder adds the incremental value and the current value for the specular or diffuse lighting component to generate a new current specular or diffuse lighting component; and a third multiplexer having a first input connected to an output of the adder and a second input at which initial values of the specular and diffuse lighting components are received, and an output connected to an input of the current specular and diffuse registers, the multiplexer forwarding either the initial or new current diffuse and specular lighting component values for storage in the respective current diffuse and specular registers.

10. The scan converter of claim 1, wherein the specular lighting component comprises red, green and blue specular lighting components and the diffuse lighting component comprises red, green and blue diffuse lighting components, and wherein the at least one interpolator comprises:

three interpolators each configured to calculate, for each fragment of each edge portion of the primitive, one of red specular and diffuse lighting component values, green specular and diffuse lighting component values, and blue specular and diffuse lighting component values; and three interpolators each configured to calculate, for each fragment of each span portion of the primitive, one of red specular and diffuse lighting component values, green specular and blue diffuse lighting component values, and blue specular and diffuse lighting component values.

11. The scan converter of claim 1, wherein a negligible specular lighting component value is a value of zero.

12. A rasterizer to rasterize graphics primitives to their component pixels, the rasterizer comprising:

a scan converter for scanning edge and span portions of a primitive to convert the primitive to fragments in a rasterized form of the primitive, the scan converter comprising at least one interpolator each of which is configured to calculate diffuse and specular lighting components at each fragment of the edge or span portion of the primitive, wherein for each edge or span portion of the primitive having a non-negligible specular lighting component, the at least one interpolator scan converts each fragment of that edge or span portion in two processing states comprising a first processing state in which a diffuse lighting component value for the fragment is determined, and a second processing state in which a specular lighting component value of that same fragment is determined.

13. The rasterizer of claim 12, wherein the at least one interpolator comprises:

at least one first interpolator each constructed and arranged to calculate diffuse and specular lighting component values of each edge portion of the primitive; and at least one second interpolator each constructed and arranged to calculate diffuse and specular lighting component values of each span portion of the primitive.

14. The rasterizer of claim 12, wherein when an edge or span portion of the primitive includes a negligible specular lighting component, the at least one interpolator calculates only the diffuse lighting component for each fragment of that edge or span portion of the primitive.

15. The scan converter of claim 12, wherein one or more of the fragments is represented by a plurality of fragment data words each comprising data defining a corresponding pixel of the rasterized form of the primitive.

16. The rasterizer of claim 12, wherein each of the at least one interpolator is a circuit comprising:

delta specular and delta diffuse registers configured to store an incremental value for the respective specular and diffuse lighting component at each fragment of an edge or span portion of the primitive;

current specular and current diffuse registers configured to store a current value of the respective specular and diffuse lighting component for each fragment of an edge or span portion of the primitive;

an adder circuit having a first input connected to the delta specular and delta diffuse registers through a first multiplexer, and a second input connected to the current specular and current diffuse registers through a second multiplexer, wherein the adder adds the incremental value and the current value for the specular or diffuse lighting component to generate a new current specular or diffuse lighting component; and a third multiplexer having a first input connected to an output of the adder and a second input at which initial values of the specular and diffuse lighting components are received, and an output connected to an input of the current specular and diffuse registers, the multiplexer forwarding either the initial or new current diffuse and specular lighting component values for storage in the respective current diffuse and specular registers.

17. The rasterizer of claim 12, wherein the specular lighting component comprises red, green and blue specular lighting components and the diffuse lighting component comprises red, green and blue diffuse lighting components, and wherein the at least one interpolator comprises:

three interpolators each configured to calculate, for each fragment of each edge portion of the primitive, one of red specular and diffuse lighting component values, green specular and diffuse lighting component values, and blue specular and diffuse lighting component values; and three interpolators each configured to calculate, for each fragment of each span portion of the primitive, one of red specular and diffuse lighting component values, green specular and blue diffuse lighting component values, and blue specular and diffuse lighting component values.

18. A method for rasterizing graphics primitives of a graphics image comprising:

determining whether each edge and span portion of the primitive includes a specular lighting component having a non-negligible value;

processing only a diffuse lighting component of each fragment of the edge and span portions determined to have a negligible specular lighting component value; and processing in separate processing states the diffuse and specular lighting component values of each fragment of the edge and span portions determined to have a non-negligible specular lighting component value.

19. The method of claim 18, wherein determining whether each edge and span portion of the primitive includes a specular lighting component having a non-negligible value comprises:

determining whether each edge and span portion of the primitive includes a specular lighting component having a value greater than zero.

20. The method of claim 18, wherein processing in separate processing states the diffuse and specular lighting component values of each fragment of edge and span portions determined to have a non-negligible specular lighting component value comprises:

processing the specular lighting component for the fragment in a first processing state; and processing the diffuse lighting component for the fragment is a second processing state;

wherein the first and second processing states are successive processing states.

* * * * *